United States Patent
Zaslavskiy et al.

(10) Patent No.: US 8,504,353 B2
(45) Date of Patent: Aug. 6, 2013

(54) PHRASE-BASED STATISTICAL MACHINE TRANSLATION AS A GENERALIZED TRAVELING SALESMAN PROBLEM

(75) Inventors: Mikhail Zaslavskiy, Gif-sur-Yvette (FR); Marc Dymetman, Grenoble (FR); Nicola Cancedda, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1022 days.

(21) Appl. No.: 12/509,633

(22) Filed: Jul. 27, 2009

(65) Prior Publication Data

US 2011/0022380 A1    Jan. 27, 2011

(51) Int. Cl.
*G06F 17/28* (2006.01)

(52) U.S. Cl.
USPC .................................... 704/4; 704/2

(58) Field of Classification Search
None
See application file for complete search history.

(56) References Cited

U.S. PATENT DOCUMENTS

| | | | | |
|---|---|---|---|---|
| 7,177,792 | B2 * | 2/2007 | Knight et al. | 704/2 |
| 2002/0188438 | A1 * | 12/2002 | Knight et al. | 704/2 |
| 2006/0195312 | A1 * | 8/2006 | Knight et al. | 704/2 |
| 2008/0154577 | A1 * | 6/2008 | Kim et al. | 704/2 |

OTHER PUBLICATIONS

Helsgaun. "An Effective Implementation of the Lin-Kernighan Traveling Salesman Heuristic" 2000.*
Cirasella et al. "The Asymmetric Traveling Salesman Problem_Algorithms_Instance Generators_and Tests" 2001.*
Balas. "New classes of efficiently solvable generalized Traveling Salesman Problems" 1999.*
Hahsler et al. "TSP—Infrastructure for the Traveling Salesperson Problem" 2006.*
Kumar et al. "On Asymmetric TSP: Transformation to Symmetric TSP and Performance Bound" 1996.*
Lin et al. "An Effective Heuristic Algorithm for the Traveling-Salesman Problem" 1973.*
Behzad et al. "A New Efficient Transformation of Generalized Traveling Salesman Problem into Traveling Salesman Problem" 2002.*
Ben-Arieh et al. "Transformations of generalized ATSP into ATSP" 2003.*
Tillmann, Christoph, "Efficient Dynamic Programming Search Algorithms for Phrase-Based SMT", Workshop on Computationally Hard Problems and Joint Inference in Speech and Language Processing, New York, New York, Jun. 2006, pp. 9-16. XP002616376.
Eisner, Jason and Tromble, Roy W., "Local Search with Very large-Scale Neighborhoods for Optimal Permutations in Machine Translation", Proceedings of the HLT-NAACL Workshop on Computationally Hard Problems and Joint Inference in Speech and Language Processing, New York, New York, Jun. 2006, pp. 57-75. XP002616377.

(Continued)

*Primary Examiner* — Greg Borsetti
(74) *Attorney, Agent, or Firm* — Fay Sharpe LLP

(57) ABSTRACT

Systems and methods are described that facilitate phrase-based statistical machine translation (SMT) incorporating bigram (or higher n-gram) language models by modeling bi-phrases as nodes in a graph. Additionally, construction of a translation is modeled as a "tour" amongst the nodes of the graph, such that a translation solution is generated by treating the graph as a generalized traveling salesman problem (GTSP) and solving for an optimal tour. The overall cost of a tour is computed by adding the costs associated with the edges traversed during the tour. Thus, the described systems and methods map the SMT problem directly into a GTSP problem, which itself can be directly converted into a TSP problem.

18 Claims, 19 Drawing Sheets

(56) References Cited

OTHER PUBLICATIONS

Zaslayskiy, Mikhail, Dymetman, Marc, Cancedda, Nicola, "Phrase-Based Statistical Machine Translation as a Traveling Salesman Problem", Proceedings of the 47$^{th}$ Annual Meeting of the ACL and the 4$^{th}$ IJCNLP of the AFNLP, Suntec, Singapore, Aug. 2009, pp. 333-341.
Partial European Search Report, Application No. EP 10 17 0129, Jan. 13, 2011.
Fischetti et al., Chapter 13 "The Generalized Traveling Salesman and Orienteering Problems," The Traveling Salesman Problem and Its Variations, pp. 609-662, 2004.
Applegate et al., "Finding Tours in the TSP," Abstract and pp. 1-59, 1999.
Applegate et al., "TSP Cuts Which Do Not Conform to the Template Paradigm," 45 pgs., 2001.
Buriol et al., "A New Memetric Algorithm for the Asymmetric Traveling Salesman Problem," Journal of Heuristics, 10:483-506, 2004.
Gutin et al., 4.5 "Traveling Salesman and Related Problems," 2003, from Handbook of Graph Theory, pp. 1-22.
"Concorde TSP" Solver http;//www.tsp.gatech.edu/concorde/ (1 pg.) accessed Jun. 30, 2009.
"Welcome to Moses!" http://www.statmt.org/moses/ (2 pgs.) accessed Jun. 30, 2009.
"Travelling salesman problem" http://en.wikipedia.org/w/index.php? title=Travelling_salesman_problem&oldid=263763673 (13 pgs.) accessed Jun. 30, 2009.
Ulrich Germann, Michael Jahr, Kevin Knight, Daniel Maracu, Kenji Yamada Fast Decoding and Optimal Decoding for Machine Translation (8 pgs.), 2001.
Adam Lopez, "Statistical Machine Translation" ACM Computing Surveys, vol. 40, No. 3, Article 8, Publication date: Aug. 2008 (49 pgs.).
Charles E. Noon, James C. Bean "An Efficient Transformation of the Generalized Traveling Salesman Problem" Technical Report 91-26, Oct. 1992 (11 pgs.).
Kris Popat, Daniel H. Greene, Justin K. Romberg, Dan S. Bloomberg, "Adding Linguistic Constraints to Document Image Decoding: Comparing the Iterated Complete Path and Stack Algorithms" Proceedings of IS&T/SPIE Electronic Imaging 2001: Document Recognition and Retrieval VIII Jan. 2001 (13 pgs.).
Kishore Papineni, Salim Roukos, Todd Ward, Wei-Jing Zhu "Bleu: a Method for Automatic Evaluation of Machine Translation" IBM Research Report, RC22176 (W0109-022) Sep. 17, 2001 (10 pgs.).
Hieu Hoang, Philipp Koehn "Design of the Moses Decoder for Statistical Machine Translation" Software Engineering, Testing and Quality Assurance for Natural Language Processing, pp. 58-65, Columbus, Ohio USA, Jun. 2008.
Christoph Tillmann, Hermann Ney "Word Reording and a Dynamic Programming Beam Search Algorithm for Statistical Machine Translation" pp. 97-133, 2003 Associate for Computational Linguistics.
Third Workshop on Statistical Machine Translation, Proceeding of the Workshop, ACL-08: HLT, Jun. 19, 2008, The Ohio State University, Columbus, Ohio, USA (12 pgs.).
Philipp Koehn, Franz Josef Och, Daniel Marcu "Statistical Phrase-Based Translation" Proceedings of HLT-NAACL 2003, Main Papers, pp. 48-54, Edmonton, May-Jun. 2003.
Gregory Gutin, Daniel Karapetyan, Natalio Krasnogor "Memetic Algorithm for the Generalized Asymmetric Traveling Salesman Problem" (12 pgs.).
Computationally Hard Problems and Joint Inference in Speech and Language Processing, Proceedings of the Workshop, HLT-NAACL-2006, Jun. 9, 2006, New York City, New York, USA (8 pgs.).
David S. Johnson, Gregory Gutin, Lyle A. McGeoch, Anders Yeo, Weixiong Zhang, Alexei Zverovitch "Experimental Analysis of Heuristics for the ATSP" Chapter 1, pp. 1-45, Draft (Nov. 24, 2001) of a chapter to appear in the book "The Traveling Salesman Problem and its Variations," Gutin and Punnen (eds), Kluwer Academic Publishers, 2002.

\* cited by examiner

PHRASE-BASED STATISTICAL MACHINE TRANSLATION AS A GENERALIZED TRAVELING SALESMAN PROBLEM

BACKGROUND

The subject application relates to statistical machine translation (SMT) in computing systems. While the systems and methods described herein relate to statistical machine translation, it will be appreciated that the described techniques may find application in other translation systems, other statistical mapping applications, and/or other translation methods.

Classical approaches to statistical machine translation (SMT) involve "bi-phrases", that is, pairs of source language and target language expressions or phrases that form building blocks for constructing a target (i.e., translated) sentence from a source sentence. Conventional approaches for decoding (i.e. translating) with these phrase-based translation models involve dynamic programming techniques, typically employing a left-to-right heuristic beam-search, as described for instance in a paper by Philipp Koehn (*Pharaoh: a beam-search decoder for phrase-based statistical machine translation models*, in Proc. Conference of the Association for Machine Translation in the Americas (AMTA), 2004). Because they build a translation heuristically from left-to-right, such methods may be overly sensitive to choices that are made early in the search, and not be able to recover easily from early mistakes.

Certain previous authors such as Germann et al. (*Fast and Optimal Decoding for Machine Translation*. Artificial Intelligence 154, pp 127-143. Elsevier 2004) have noted some analogies between SMT decoding and the Travelling Salesman Problem, but fail to map the SMT decoding problem into a Travelling Salesman Problem. Instead, such approaches map the decoding problem into a linear integer program for solving a certain version of word-based (and not phrase-based) SMT. Such approaches are only able to solve very small translation problems, and do not contemplate phrase-based SMT.

Additionally, such integer programming approaches (which contrast with conventional beam-search approaches) do not map phrase-based SMT directly into a generalized traveling salesman problem (GTSP) problem. Such integer programming approaches, which are very generic, are also often very inefficient. In addition, integer programming formulations are typically suited to cases where exact optimal solutions are requested, which is much more demanding in terms of computing resources than when approximate solutions are sought. A single GTSP formulation allows for employing either exact solvers or approximate well-adapted solvers. Additionally, such integer programming approaches only incorporate bigram language models, and not trigram or n-gram language models.

N-gram language models are a type of probabilistic model for predicting the next item in a sequence. N-grams are used in various areas of statistical natural language processing and genetic sequence analysis. An n-gram is a sub-sequence of n items from a given sequence. The items in question can be phonemes, syllables, letters, words, base pairs, etc.

Additionally, there are several drawbacks to conventional phrase-based beam-search decoders. Because they build a translation from left-to-right, they tend to show inertia relative to bad choices which may be done at the beginning of the search, when partial candidates are still short and the heuristic estimate of the remainder is weak. If a construct appearing in the middle of the source sentence is strongly constraining, this knowledge cannot be exploited before choices that are related to constructs more to the left in the source sentence are exploited, although such choices may be less constraining. Because it is necessary to prune the search tree during the search in order to avoid combinatorial explosion, the solution that is found at the end of the search is typically suboptimal, and whether it is actually optimal can never be known.

Statistical Machine Translation (SMT) systems that employ "phrase-based" translation techniques build translations by relying on building blocks, called "biphrases," such as are used in the following example:

Les plaisanteries les plus courtes sont toujours les meilleures

The shortest jokes are always the best

In this example, the biphrases that are employed for producing the translation are the following:

les—the
plaisanteries—jokes
les plus courtes—shortest
sont toujours—are always
les meilleures—the best With regard to biphrases, the following points may be noted. There may be several biphrases competing to translate a given source segment. For instance, a bi-phrase library (e.g., a database) may contain the following entries: les plus courtes—the shortest, sont—are, toujours—always, and so forth. Additionally, the ordering of the target sentence may be different from that of the source. For instance, while plaisanteries appears before les plus courtes in the source sentence, shortest appears after jokes in the target sentence.

In order to translate a given source sentence S, such as les plaisanteries les plus courtes sont toujours les meilleures, classical phrase-based SMT systems use a log-linear model of the form:

$$p(t,a|s) = 1/Z_s \exp \Sigma_k \lambda_k h_k(s,a,t)$$

where the $h_k$'s are features, that is, functions of the source string s, of the target string t, and of the alignment a, and where the alignment is a representation of the sequence of biphrases that are used to build t from s. In the example provided herein, the sequence of biphrases is: les—the, les plus courtes—shortest, plaisanteries—jokes, sont toujours—are always, and les meilleures—the best. It will be noted that the order of this sequence is defined by reference to the target side: a bi-phrase b precedes a bi-phrase b' in the alignment if and only if the target side of b precedes the target side of b' in the target t. The $\lambda_k$'s are weights and $Z_s$ is a normalization factor that guarantees that p(t,a|s) is a proper conditional probability distribution over the pairs (t,a).

Features that are local to biphrases, namely features that can be computed additively over biphrases participating in the alignment a, include (without being limited to): the forward and reverse conditional probability features log $p(\tilde{t}|\tilde{s})$ and log $p(\tilde{s}|\tilde{t})$, where $\tilde{s}$ is the source side of the bi-phrase and $\tilde{t}$ is the target side, and where these probabilities have been estimated on the basis of a large bilingual training corpus; the so-called "phrase penalty" feature, which is equal to 1 for each bi-phrase in the alignment; and the so-called "word penalty" feature, which counts the number of words in t.

Features that depend on the order in which biphrases appear in the alignment include: the language model feature log p(t), which computes the probability of the target sentence associated with the translation candidate, typically according to an n-gram language model estimated over a large target language corpus; the distortion feature, which measures how much the sequence of biphrases used in the candidate translation deviates from the "monotonic" order, namely the order that would be imposed if the target sides of the biphrases were sequenced in the same order as their source-sides.

Once a log-linear model has been defined (which involves a training phase; see e.g. Lopez, A. 2008. *Statistical Machine Translation*. ACM Comput. Surv. 40, 3 (August 2008), 1-49, incorporated by reference herein), the role of the decoder is to find a pair (t,a) that maximizes the conditional probability p(t,a|s), and to output the corresponding target string t.

Classical systems are based on some variant of a heuristic left-to-right search, that is, they attempt to build a candidate translation (t,a) incrementally, from left to right, extending the current partial translation at each step with a new biphrase, and computing two scores: a score for the known elements of the partial translation so far, and a heuristic estimate of the remaining cost for completing the translation. The variant which is most often used is a form of beam-search, where several partial candidates are maintained in parallel, and candidates for which the current estimate is too low are pruned in favor of candidates that are more promising.

Accordingly, there is an unmet need for systems and/or methods that employ phrase-based SMT by modeling the bi-phrases as nodes in a graph and applying a traveling salesman problem solver to the graph, while overcoming the aforementioned deficiencies.

BRIEF DESCRIPTION

In accordance with various aspects described herein, systems and methods are described that facilitate SMT for phrase-based models incorporating bigram (or higher n-gram) language models by modeling the bi-phrases as nodes in a graph. For example, a method of translating two languages using statistical machine translation (SMT) and a generalized asymmetric traveling salesman problem (GTSP) graph comprises defining a SMT as a GTSP, and translating blocks of an input sentence using bi-phrases corresponding to nodes in a GTSP graph that represents the GTSP. The method further comprises solving the GTSP; and outputting the translated blocks in an order defined by the GTSP solution.

According to another feature described herein, a system that facilitates phrase-based statistical machine translation (PBSMT) comprises a processor that defines a PBSMT as a GTSP, and translates blocks of an input sentence using bi-phrases corresponding to nodes in a GTSP graph that represents the GTSP. The processor further solves the GTSP, and outputs the translated blocks in an order defined by the GTSP solution.

Yet another feature relates to a method of phrase-based statistical machine translation (PBSMT), comprising defining a PBSMT task as a generalized traveling salesman problem (GTSP), generating a graph of the GTSP comprising a plurality of nodes, and generating an optimal tour of the graph. The method further comprises computing a true cost $C_t$ of the optimal tour, computing an apparent cost $C_a$ of the optimal tour, determining a difference D between the true cost $C_t$ and an apparent cost $C_a$, and determining whether the difference D is less than a predetermined threshold $\epsilon$. Additionally, the method comprises outputting the optimal tour as a solution to the GSTP if D is less than the predetermined threshold $\epsilon$, and translating the input sentence from a first language to a second language using the output GSTP solution.

DETAILED DESCRIPTION

In accordance with various features described herein, systems and methods are described that facilitate phrase-based SMT by modeling bi-phrases as nodes in a graph. "Gram," as used herein, refers to words, such that a bigram language model employs two-word groups, a trigram language model employs three-word groups, and so on. For instance, a different approach to decoding is described which is based on the formulation of phrase-based translation as a Generalized Traveling Salesman Problem (GTSP), a standard generalization of the Traveling Salesman Problem (TSP) described by Fischetti et al. in *The Generalized Traveling Salesman and Orienteering Problems* (in The Traveling Salesman Problem and Its Variations, 2002, p. 609-662), which is hereby incorporated by reference. The herein-described approach facilitates capitalizing on the wealth of research and (exact or approximate) decoding algorithms that have been developed for solving the GTSP and its simpler version the TSP, some of the most important and well-studied problems in Combinatorial Optimization, and also problems which have witnessed considerable progress in the last decade.

In the subject systems and methods, biphrases are modeled as nodes in a graph. Additionally, construction of a translation is modeled as a "tour" amongst the nodes of the graph, that is, a path that visits each node exactly once. The overall cost of a tour is computed by adding the costs associated with the edges traversed during the tour.

Thus, the described systems and methods map the SMT problem directly into a GTSP problem, rather than simply noting some similarities of the SMT problem with the Traveling Salesman Problem and then actually implementing some small-sized instances of SMT through related techniques of a more generic, but much less efficient, nature (e.g., general integer programming algorithms) than the TSP or GTSP. The described systems and methods additionally express phrase-based translation as a GTSP. Additionally, the present disclosure presents examples that show the usefulness of the GTSP formulation on realistic test data. Moreover, the described approach to decoding involves phrase-based SMT models in conjunction with formulating the translation as a GTSP, which is not dependent on a left-to-right organization of the search and has various advantages over conventional techniques.

Figure 1:
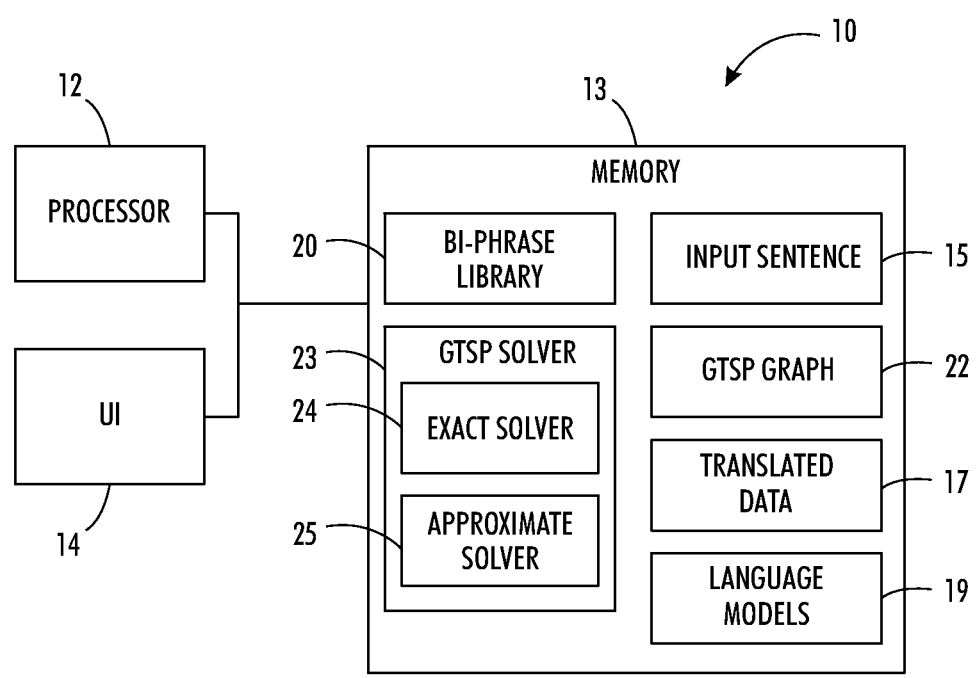
FIG. 1, a system is illustrated, which facilitates performing phrase-based SMT using a generalized traveling salesman (GTSP) approach to generate a graph for use in translating between languages.

With reference to FIG. 1, a system 10 is illustrated, which facilitates performing phrase-based SMT using a generalized traveling salesman (GTSP) approach. The system includes a processor 12 that executes, and a memory 14 that stores, computer-executable instructions for carrying out the various techniques, methods, applications, algorithms, etc., described herein.

The memory 13 may comprise a computer program product that may be executed on a computer. The computer program product may be a computer-readable recording medium (e.g., memory 13) on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the described techniques, procedures, and/or methods may be implemented in a transmittable carrier wave in which the control program is embodied as a data signal using transmission media, such as acoustic or light waves, such as those generated during radio wave and infrared data communications, and the like.

According to an example, the described techniques may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

The system 10 further comprises a user interface 14 into which a user can enter input sentence 15, such as a sentence to be translated, for translation by the system using one or more of the techniques or methods described herein. The input sentence 15 is processed by the processor 12 using one or more computer-executable algorithms, and optionally passes through one or more stages of intermediate data until translated data 17 (e.g., the translated sentence) is output to the user interface 14.

The memory 13 additionally stores various components (e.g., computer-executable instructions or the like) for translating the input sentence 15. Additionally, pre-generated bi-phrases are stored in a bi-phrase library 20.

Upon receiving an input sentence for translation, the processor 12 retrieves the bi-phrases from the bi-phrase library 20 that are compatible with the input sentence; It also accesses the language model 19 and constructs a GTSP graph 22 exploiting the retrieved bi-phrases and the language model.

To generate an optimal tour through the nodes of the GTSP graph 22, the processor executes a TSP solver 23, which may be one or more of an exact solver algorithm 24, an approximate solver algorithm 25, etc.

According to an example, the system 10 facilitates phrase-based statistical machine translation (PBSMT) of the input sentence by applying the GTSP graph 22 to the input sentence 15. The processor 12 defines a PBSMT task as a generalized traveling salesman problem (GTSP). The processor retrieves one or more bi-phrases consistent with the input sentence from the bi-phrase library 20, and generates the GTSP graph 22 comprising a plurality of nodes, each of which corresponds to a bi-phrase. The TSP solver 23 is executed to generate an optimal tour of the GTSP graph 22.

In one embodiment, when using an n-gram language model (with n larger than 2) instead of a bigram language model, the processor computes a true cost $C_t$ of the optimal tour, an apparent cost $C_a$ of the optimal tour, and determines a difference D between the true cost $C_t$ and an apparent cost $C_a$. The processor outputs the optimal tour as a solution to the GSTP if D is less than a predetermined threshold $\epsilon$, and translates the input sentence from a first language to a second language using the output GSTP solution.

The processor 12 refines at least one node in the GTSP graph 22 if D is greater than or equal to the predetermined threshold $\epsilon$, and generates a refined graph comprising the refined node. The processor continues to iteratively compute the true cost $C_t$ and apparent cost $C_a$ for each refinement of the graph, determines the difference D there between, and compares the difference D to the predetermined threshold $\epsilon$, until D is less than $\epsilon$.

Traveling salesman problem (TSP) models include four main variants, which are described as follows. The symmetric TSP (STSP) involves a non-directed graph G on N nodes, where the edges (lines) carry real-valued costs, with $+\infty$ an allowed cost. The STSP problem consists in finding a "tour" of minimal total cost, where the tour (also called a *Hamiltonian Circuit*) is a "circular" sequence of nodes $X_1, X_2, \ldots, X_N, X_1$ visiting each node of the graph exactly once, and where the total cost of the tour is computed by adding the contribution of the corresponding edges.

The Asymmetric TSP, or ATSP, is the variant of the STSP where the underlying graph G is directed and where, for two nodes of the graph a and b, the edges (a,b) and (b,a) may carry different costs.

The Generalized Symmetric TSP, or SGTSP involves a non-oriented graph G of N nodes with edges carrying real-valued costs. Given a partition of these N nodes into M non-empty, disjoint, subsets (called clusters), the object is to find a circular sequence of M nodes $X_1, X_2, \ldots, X_M, X_1$ of minimal total cost, where each cluster is visited exactly once.

The Generalized Asymmetric TSP, or GTSP is similar to the SGTSP, but the graph G is a directed graph. As used herein, where a GTSP is described, it will be understood to be an asymmetric GTSP, unless otherwise indicated.

The STSP is often simply denoted TSP, and is known to be NP-hard; however there has been enormous interest in developing efficient exact and approximate solvers for it, where the "efficiency" is measured by the time required for solving large benchmark examples such as provided in the so-called TSPLIB library.

The ATSP, SGTSP and GTSP can all be mapped by simple (e.g., polynomial or linear increase in the size of the problem instances) transformations into STSP. In one embodiment, two "transformers" (e.g., programs stored in the memory and executed by the processor) are employed: one for a GTSP-to-ATSP transformation, and one for an ATSP-to-TSP transformation. Two such transformations are described with regard to the following figures.

Figure 2:
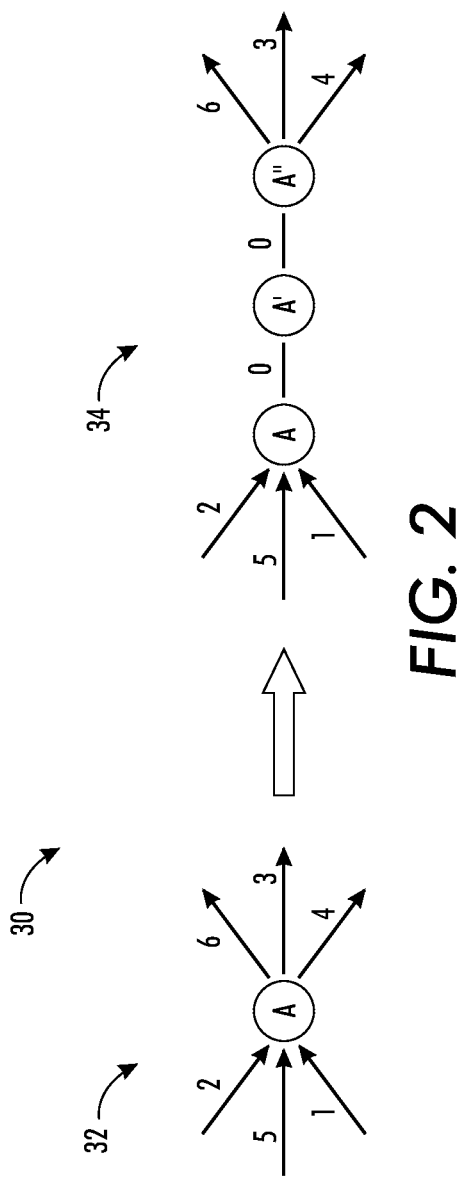
FIG. 2 illustrates a first transformation for transforming an ATSP into a standard TSP, with a plurality of edges labeled 0-6 according to their respective "costs."

With continued reference to FIG. 1, FIG. 2 illustrates a first transformation 30 with a plurality of edges labeled 0-6 according to their respective "costs." An example of this type of transformation is described by Applegate et al., The Traveling Salesman Problem: A Computational Study, Princeton UP, 2006., p. 126, which is hereby incorporated by reference. Each node A of an original directed graph 32 is replaced by three nodes A, A', A'' of the transformed undirected graph 34, with two "0-cost" edges added. Because an intermediate node A' must be present in any tour of the undirected graph, so must the 0-cost edges; this in turn precludes a tour that would first traverse, for example, an edge with cost 2 followed by an edge with cost 5 (and similarly for any pair of edges that would correspond to "reversing" directions), because the tour would then need to include three edges incident on node A, which is impossible. Thus any optimal tour of the undirected graph 34 corresponds to an optimal tour of the original graph 32.

Figure 3:
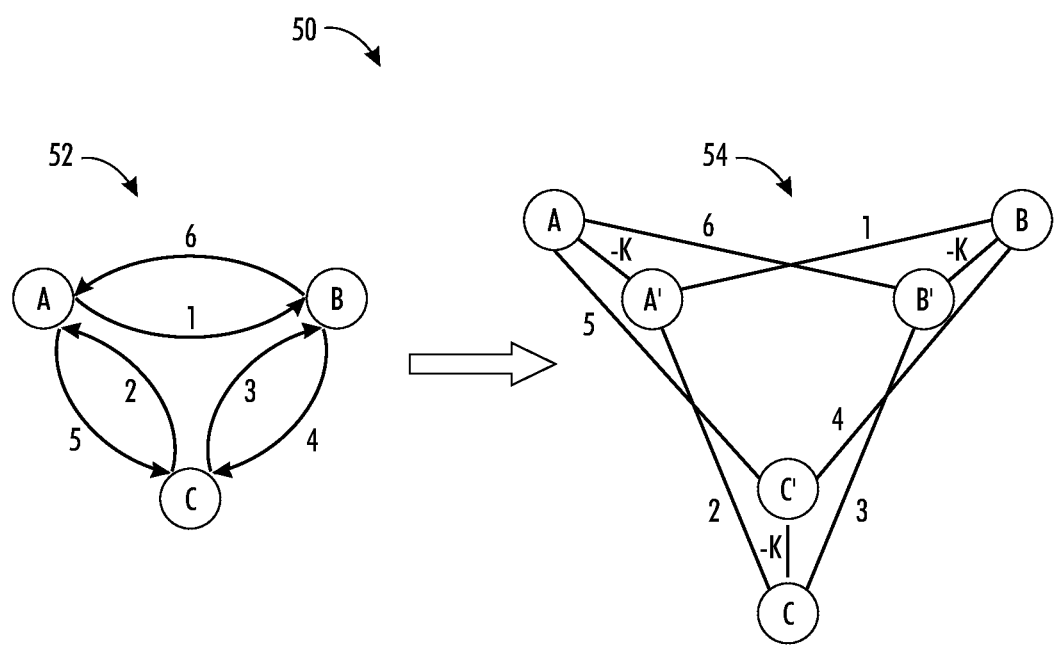
FIG. 3 illustrates a second transformation for transforming an ATSP into a standard TSP, which may be used in conjunction with the various systems and methods described herein.

FIG. 3 illustrates a second transformation 50, which may be used in conjunction with the various systems and methods described herein, and which has the advantage of only introducing two nodes to replace one node of the original graph, but at the cost of introducing large artificial weights on some of the edges. Each node X (e.g., nodes A, B, and C) of an original graph 52 is duplicated into nodes X and X', with a large negative weight $-K$ linking X and X', and the cost of the directed edge (X,Y) in the original graph is reproduced on the edge (X',Y) in the transformed graph 54. If K is taken to be sufficiently large (e.g., K can be taken K to be larger than the sum of all finite costs in the original graph 52, although less conservative values can be found), then any optimal tour in the undirected graph 54 will prefer traversing the (X,X') edges to any other configuration, because not traversing any of these edges means losing at least K units of cost. However, this means that in any optimal tour of the nodes of the transformed graph 54, X and X' will always be next to each other, and as there are no links between X and Y or between X' and Y', the only such tours will be of the form $X_1, X_1', X_2, X_2', \ldots, X_N, X_N', X_1$ or $X_1', X_2, X_2', \ldots, X_N, X_N', X_1, X_1'$, which corresponds to a constraint forbidding "changes of direction" in the original graph 52.

Figure 4:
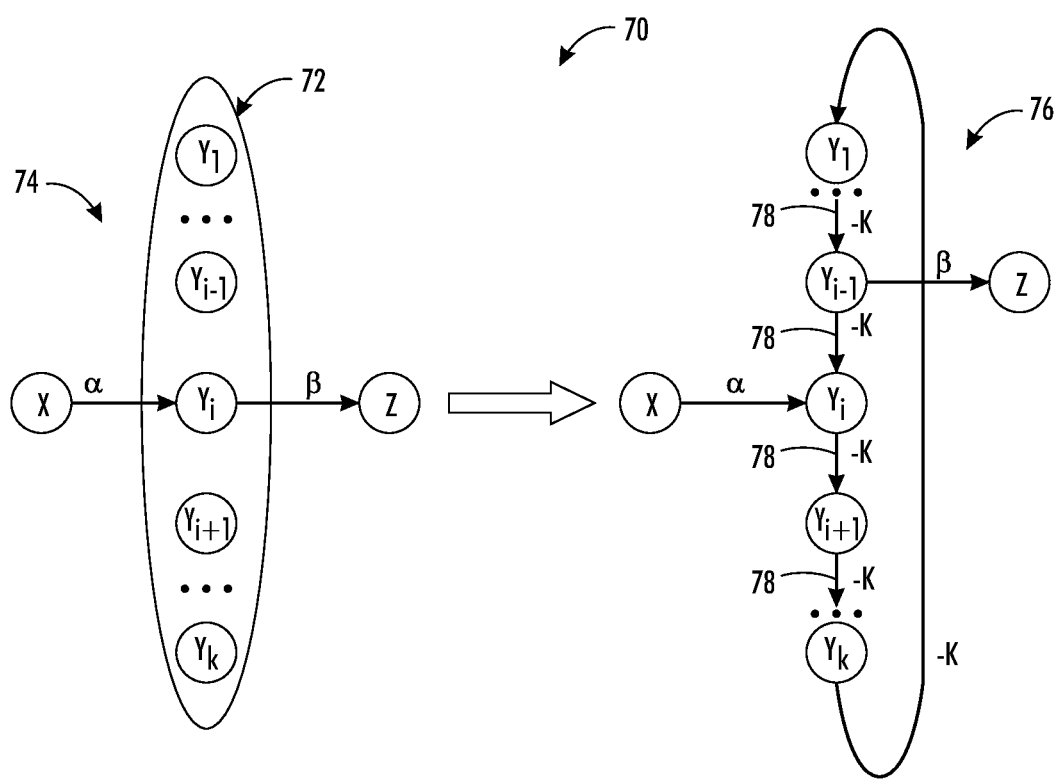
FIG. 4 illustrates a transformation that transforms an GTSP into an ATSP.

FIG. 4 illustrates a transformation 70 that transforms the GTSP into the ATSP. An example of this transformation is described by Noon et al, in "An efficient transformation of the generalized traveling salesman problem," INFOR 31 (1993), pp. 39-44, which is hereby incorporated by reference. In this transformation, it is assumed that $Y_1, \ldots, Y_k$ are the nodes of a given cluster 72 in an original graph 74, while X and Z are arbitrary nodes belonging to other clusters. In the transformed graph 76, edges 78 are introduced between the $Y_i$'s in order to form a cycle as shown in the figure, where each edge has a large negative cost $-K$. The incoming edge to $Y_i$ from X is left alone, but the outgoing edge from $Y_i$ to Z has its origin changed to $Y_{i-1}$. A feasible tour in the original GTSP problem passing through $X, Y_i, Z$ is then "encoded" as a tour of the transformed graph 76 that first traverses X, then traverses $Y_i, Y_{i+1}, \ldots, Y_k, \ldots, Y_{i-1}$, then traverses Z (this encoding will have the same cost as the original cost, minus $(k-1)K$). Additionally, if K is large enough, then the solver for the transformed ATSP graph will tend to traverse as many $-K$ edges as possible, meaning that it will traverse exactly $k-1$ such edges, e.g. all but one of the edges associated with the cluster (the solver does not traverse all such edges because then it could not find a tour for the whole graph). That is, it will produce a tour that is an encoding of some feasible tour of the GTSP problem.

The following example illustrates phrase-based decoding as a traveling salesman problem, wherein the French sentence "cette traduction automatique est curieuse" is translated into English. The relevant biphrases for translating the sentence are shown in Table 1, below.

TABLE 1

| bi-phrase identifier | source | target |
|---|---|---|
| h | cette | this |
| t | traduction | translation |
| ht | cette traduction | this translation |
| mt | traduction automatique | machine translation |
| a | automatique | automatic |
| m | automatique | machine |
| i | est | is |
| s | curieuse | strange |
| c | curieuse | curious |

Under this model the following translations are produced:
h.mt.i.s→this machine translation is strange
h.c.t.i.a→this curious translation is automatic
ht.s.i.a→this translation strange is automatic
where the ordered sequence of biphrases that leads to each translation is indicated on the left side of the arrow. Decoding is then formulated as a Generalized Traveling Salesman Problem, in the following manner: the graph nodes represent all the possible pairs (w,b), where w is a source word in the source sentence s, and b is a bi-phrase containing this source word. Different occurrences of the same word type are considered as different words here. A special bi-phrase $b_\$=(\$,\$')$ is introduced, where \$ (resp. \$') will be a special source word marking the beginning of the source (resp. target) sentence, and the corresponding additional graph node $\$\$=(\$,(\$,\$'))$, which will be associated to the pair $(\$,b_\$)$.

The graph clusters will be the subsets of the graph nodes that share a common source word w; the node \$\$ will be the only node in the cluster associated with the source word \$. The costs of a transition between nodes M and N of the graph are defined in the following manner: If M is of the form (w,b) and N of the form (w',b), in which b is a single bi-phrase, and w and w' are consecutive words in b, then the transition cost is 0 (no cost to the transition). Intuitively, once committed to using the first word of b, there is no additional cost for traversing the other source words covered by b. If M is of the form (w, b), in which w is the "rightmost source word" in the bi-phrase b, and N of the form (w', b'), in which w'≠w is the "leftmost source word" in b', then the transition cost corresponds to the actual cost of selecting the bi-phrase b' just after having selected the bi-phrase b. Seen from the source sentence, this corresponds to "consuming" the source side of b' after having consumed the source side of b (whatever their relative positions in the source sentence), and seen from the target side, this corresponds to producing the target side of b' directly after having produced the target side of b.

The transition cost is then the addition of several contributions, including the static cost associated with b in the biphrase library 20 (FIG. 1). This cost corresponds to such component as forward and reverse conditional probabilities, number of target words in the bi-phrase, and the like (see description in the Introduction). The "distortion" cost is associated to the choice of consuming the source word w' just after having consumed the source word w. In the case where w' is the word that directly follows w in the source sentence, this cost is zero, and corresponds to the situation where the consecutivity of the target sides of b and b' is preserved by their targets. In other cases, the cost is computed as the absolute value of (pos(w)+1−pos(w')), where pos(w) and pos(w') are the positions of w and w' in the source sentence. The "language model" cost is the cost of producing the target words of b' in the context of just having produced the target words of b. If a bigram language model is assumed, this cost can be precomputed as soon as b and b' are known, because b contains at least one word on its target side, which allows computation of the contribution of the first target word of b' knowing the last target word of b. As for the second, third, etc., target words of b', their contributions are computed on the basis of b' alone. Note that this restriction to bigram models can be overcome using other techniques discussed herein.

In the case where one of the biphrases b and b' is equal to $$, straightforward adaptations of the previous contributions can be easily performed. In all other cases, the transition cost is infinite, or, in other words, there is no edge in the graph between M and N.

Figure 5:
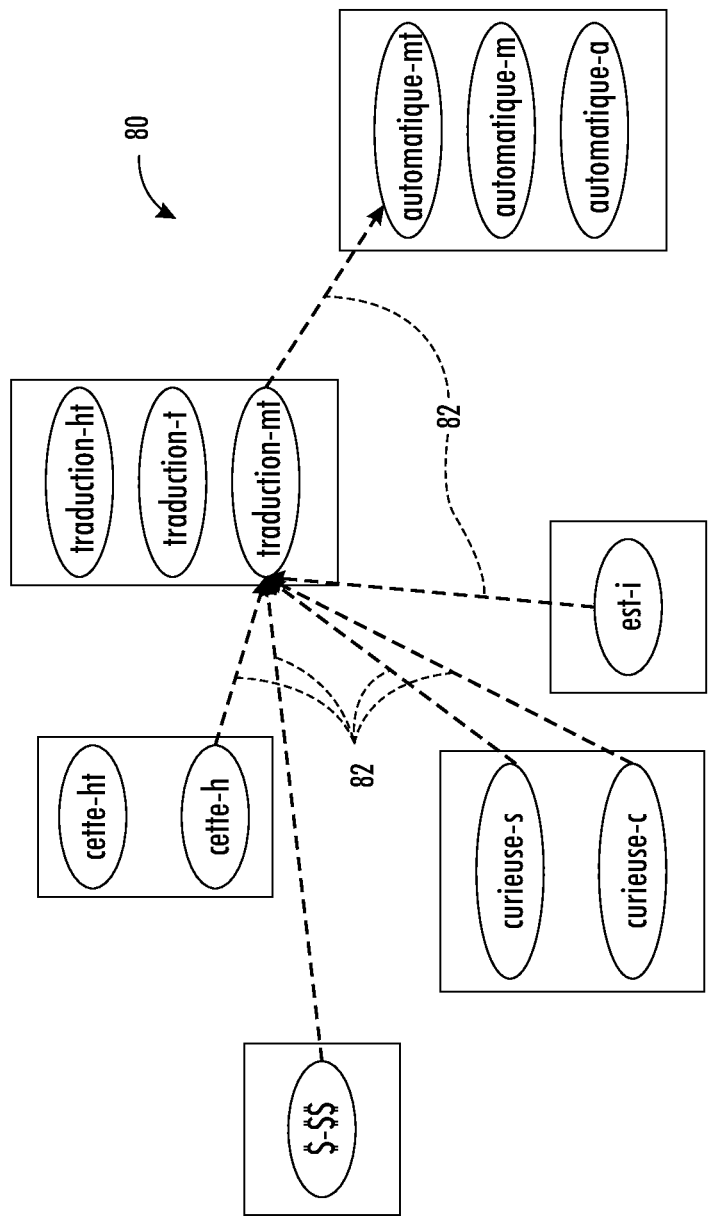
FIG. 5 illustrates a transition graph for the source sentence cette traduction automatique est curieuse, in which only a subset of the existing edges is shown, namely all those edges entering or exiting the node traduction-mt.

FIG. 5 illustrates a transition graph 80 for the source sentence cette traduction automatique est curieuse, in which only a subset of the existing edges is shown, namely all those edges 82 entering or exiting the node traduction-mt. Note that the only successor to traduction-mt is automatique-mt, and that cette-ht is not a predecessor of traduction-mt. Alternatively, the edges could be drawn from automatique-m and automatique-a to traduction-mt, but such edges in fact cannot be traversed because the only exit from traduction-mt is to automatique-mt, and this node is in exclusion with other nodes in its cluster.

Figure 6A:
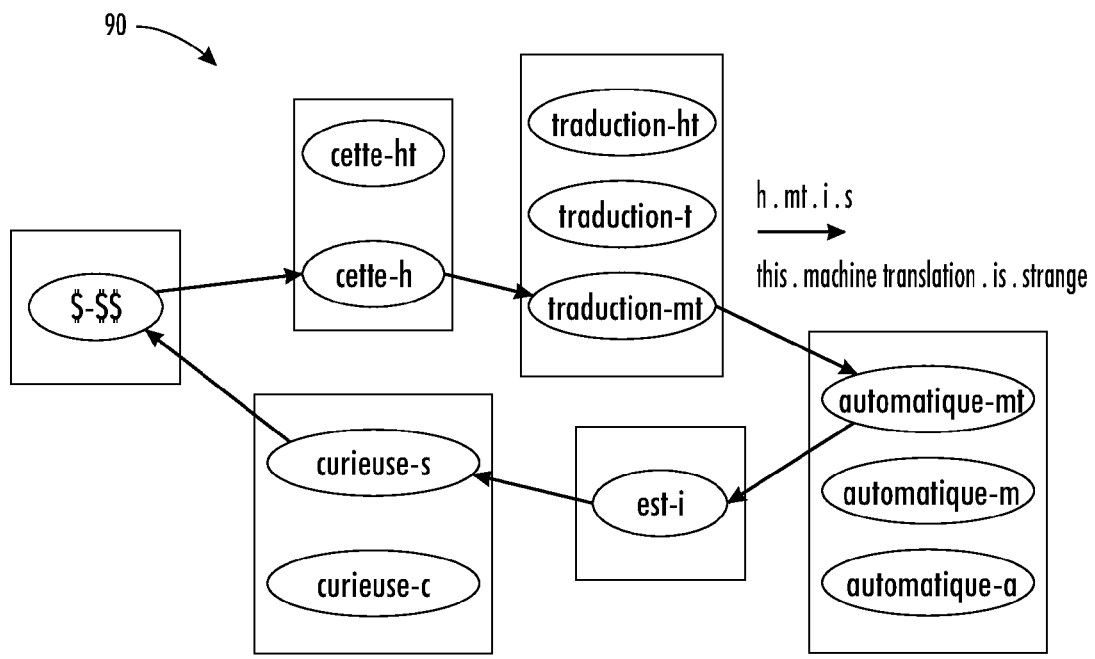
FIGS. 6A and 6B illustrate two GSTP tours, corresponding to two respective outputs.
Figure 6B:
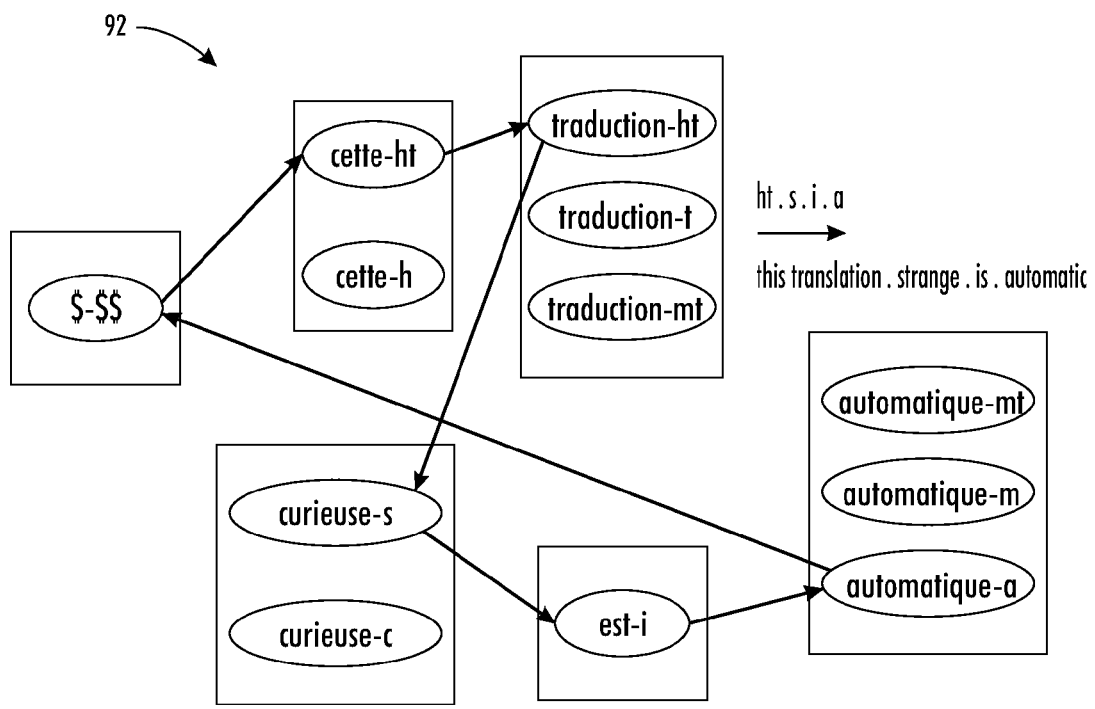

FIGS. 6A and 6B illustrate two GSTP tours, corresponding to the two outputs indicated. In FIG. 6A, the tour 90 results in the output h.mt.i.s. In FIG. 6B, the tour 92 results in the output ht.s.i.a.

The model described with regard to the preceding figures corresponds to an asymmetric version of the Generalized TSP. Given this reformulation, there are several strategies that can be followed: algorithms specifically designed for GTSP may be used; an GTSP may be transformed into an ATSP and algorithms designed for ATSP may be used; and/or an ATSP may be transformed into an STSP and algorithms for STSP may be used. Each option has its own advantages and disadvantages. If existing efficient solvers for TSP are to be used, such as a Concorde solver (see, e.g., www.tsp.gatech.edu/concorde), the STSP formulation is employed. However, when the ATSP is transformed into an STSP, the number of vertices in the TSP graph doubles. Furthermore, the passage from GTSP to ATSP is a potential source of inefficiency, because a more general formulation is employed. Therefore, it may be desirable to use the STSP reformulation along with the Concorde technique.

Another important factor is whether the exact solution is desired or whether an approximate solution may be sufficient. For example, in the case of STSP, the exact solution (e.g., a Concorde solver) may be employed, or an approximate algorithm (e.g., a Lin-Kernighan heuristic) may be used.

When the language models are of the bigram type, the models that have been described have the following important "Markovian" property: the cost of a path is additive relative to the costs of the transitions between two consecutive nodes on the path. For example, in FIG. 6A, the cost of the translation candidate this.machine translation.is.strange can only take into account the conditional probability of the word strange relative to the word is, but not relative to the words translation and is.

In another embodiment, the power of the model is extended from using bigram language models to using more powerful n-gram language models, such as 3-gram language models, and several approaches can be applied. The first approach comprises "compiling out" all biphrases in which the target side only contains one word, in order to only retain biphrases that have a target side of at least two words. In this manner, when the target sides of two biphrases b and b' are concatenated, the trigram language model has enough context to compute the contribution of b' relative to b, because b contains at least two words. To ensure proper function, an extension of the notion of bi-phrase is employed: an extended bi-phrase is now defined as an ordered sequence of biphrases $[(\tilde{s}_1,\tilde{t}_2).(\tilde{s}_2,\tilde{t}_2) \ldots (\tilde{s}_k,\tilde{t}_k)]$, where $k \geq 1$ and each $\tilde{s}_i$ (resp. $\tilde{t}_i$) is a list of source (resp. target) words. If k=1, then the technique reverts back to the original notion of bi-phrase. The interpretation of the notion for the translation of a source sentence s is somewhat different from the original case: while it is still required that the tokens in each individual $\tilde{s}_i$ are matched consecutively in s, it is not required that the $\tilde{s}_1, \tilde{s}_2, \ldots, \tilde{s}_k$ are matched consecutively or even in that order inside s. On the other hand, on the target side, the tokens in $\tilde{t}_1, \tilde{t}_2, \ldots, \tilde{t}_k$ are produced consecutively and in that order. Under this notation, and using the same table of possible biphrases as before, such extended bi-phrases as mti, ti and si are provided, where:

mti=[mt.i]=[(traduction automatique, machine translation).(est, is)]
ti=[t.i]=[(traduction, translation).(est, is)]
si=[s.i]=[(curieuse, strange).(est, is)]

which can be used for producing the translations:
[h].[mt.i].[s]→this machine translation is strange
[h].[c].[t.i].[a]→this curious translation is automatic
[ht].[s.i].[a]→this translation strange is automatic A major difference between the original account of the translation process and the present one is that an extended bi-phrase encapsulates under a single unit what may have been accomplished previously through a sequence of units. As for the encoding of the translation process as a GTSP graph, it is straightforward: nodes of the graphs are now pairs (w,b) where w is a word of the source sentence and b is an extended biphrase, and clusters are subsets of nodes having the same w. By extension to the original rule, a path in the graph that enters a node of the form $(w,b)=(w,[(\tilde{s}_1,\tilde{t}_1).(\tilde{s}_2,\tilde{t}_2) \ldots (\tilde{s}_k,\tilde{t}_k)])$, w being the first word in $\tilde{s}_1$, must traverse all the words of $\tilde{s}_1$ in order, then traverse all the words of $\tilde{s}_2, \ldots$, and finally traverse the words of $\tilde{s}_k$ before it can "leave" the extended bi-phrase b (at which point there is a real choice, namely selecting the next extended biphrase). The costs "internal" to the extended bi-phrase $[(\tilde{s}_1,\tilde{t}_1).(\tilde{s}_2,\tilde{t}_2) \ldots (\tilde{s}_k,\tilde{t}_k)]$ can be precompiled by adding the costs (including the distortion costs) that would have been incurred when transitioning from $(\tilde{s}_1,\tilde{t}_1)$ to $(\tilde{s}_2,\tilde{t}_2)$, etc. Generally, it is straightforward to compute the cost of a path across extended biphrases by "recovering" the cost incurred by considering the corresponding path across the component elementary biphrases.

Returning to the issue of moving from a bigram language model to a trigram language model, the following steps are performed: remove from the bi-phrase library the bi-phrase i, which has a single word target; and add to the library the extended biphrases mti, ti, si, etc., (e.g., all the extended biphrases consisting of the concatenation of a bi-phrase in the library with i). These extended biphrases provide enough context to compute a trigram probability for the target word produced immediately next (in the examples given, for the words strange, automatic and automatic respectively). When these steps are performed exhaustively for all biphrases (relevant for the source sentence at hand) similar to i, namely that have a single-word target, a representation is obtained that allows a trigram language model to be computed at each point.

Figure 7:
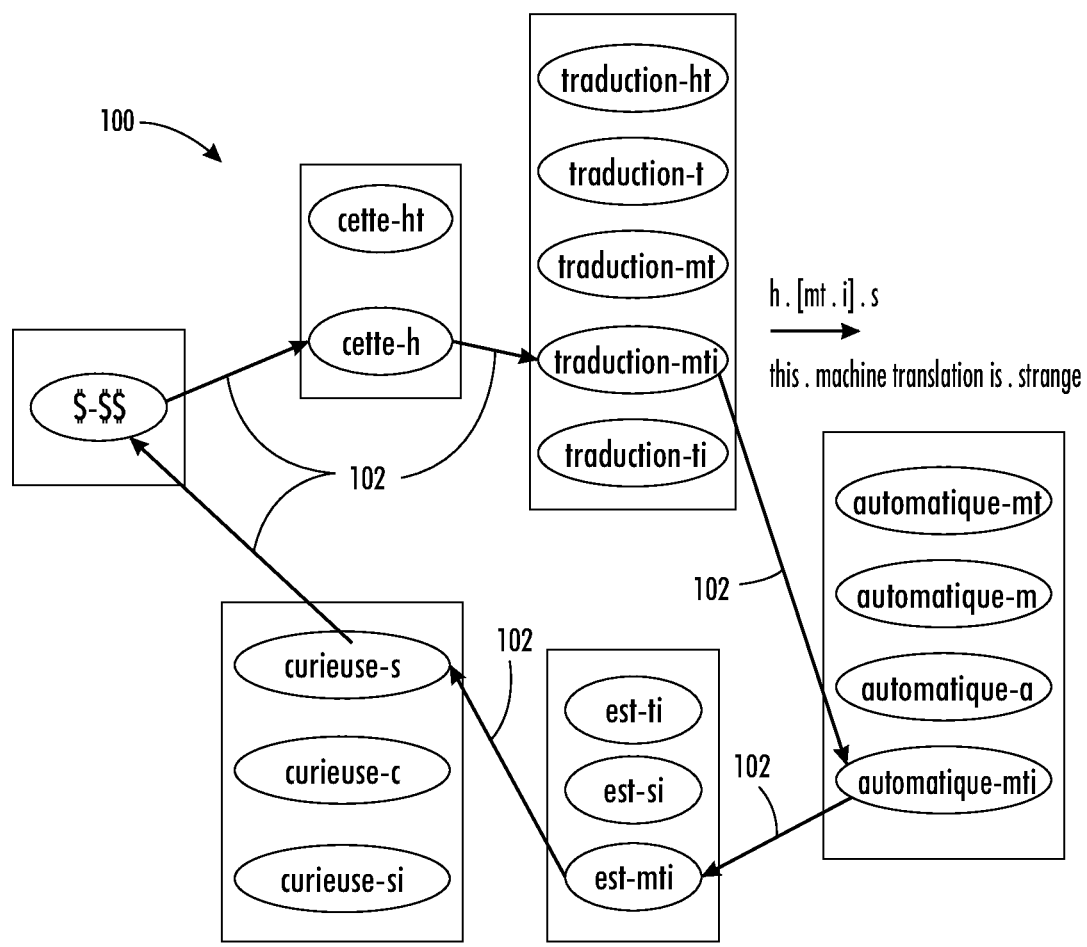
FIG. 7 illustrates a graph in which only the bi-phrase "i" has been eliminated, where only some of the extended biphrases that now encapsulate "i" are shown with edges defining one valid tour through the graph.

FIG. 7 illustrates a graph 100 in which only the bi-phrase "I" has been eliminated, where only some of the extended biphrases that now encapsulate "I" are shown with edges 102 defining one valid circuit or tour through the graph. It will be noted that the edge connecting the two nodes (est,mti) and (curieuse,s) is now associated with a trigram cost p(strange|translation is) because mti provides a large enough target context.

Figure 8:
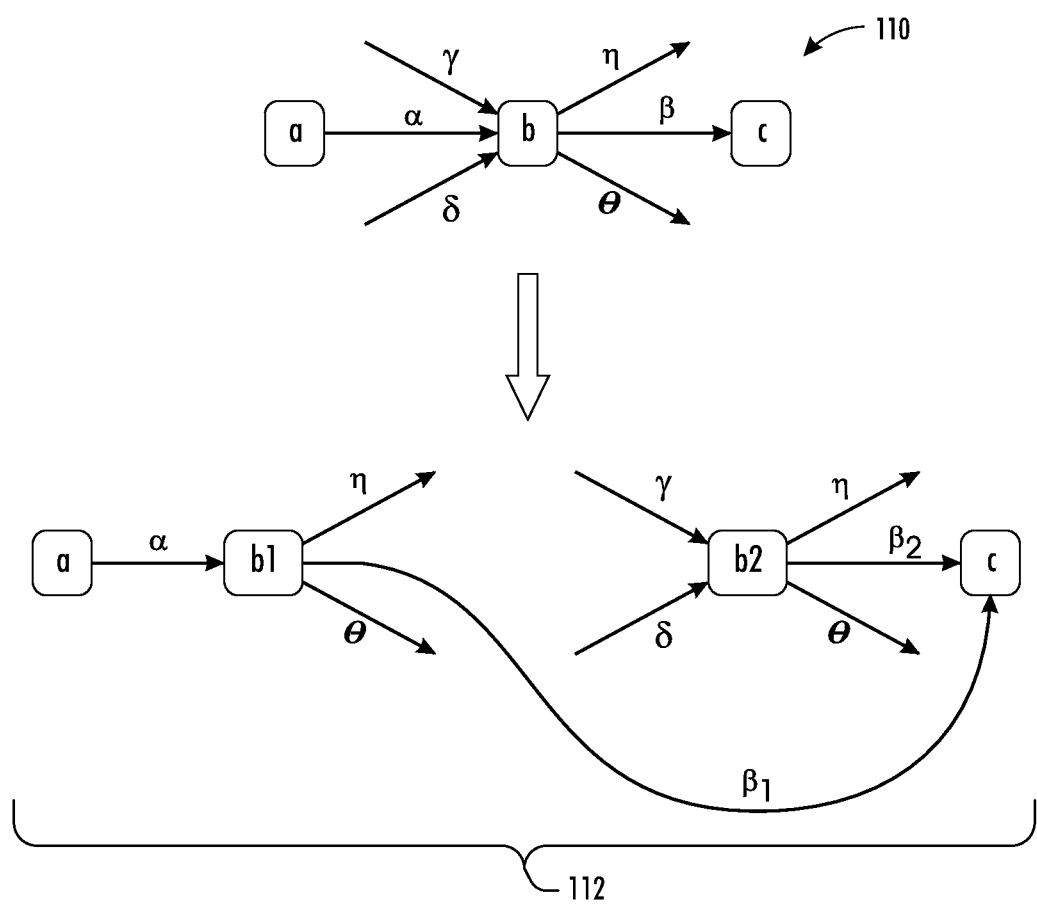
FIG. 8 illustrates selective on-demand refinement.

FIG. 8 illustrates a second approach involving selective on-demand refinement. While the exhaustive "compiling out" method just described works in principle, if for the sentence to be translated, there are m relevant biphrases, among which k have single-word targets, then k.m extended biphrases will be created, which may represent a significant overhead for the TSP solver as soon as k is large relative to m. This effect may be exacerbated if the compiling out method is extended to n-gram languages models with n>3.

To mitigate this effect, the second approach uses selective refinement, which has two components. The first component is the ability to refine the context of chosen nodes in the graph, rather than refining the context of all nodes respecting some broad criterion (such as having a target side of length one). Such refinements then provide a trigram context for a minority of nodes in the graph, but only a bigram context for the rest of the nodes. The second component consists of the maintenance of certain bounding inequalities between the optimal TSP solutions for such refinements and the "true" optimal solution that would be reached if trigram contexts were used for all nodes in the graph, which guarantees a convergence of the refinement process to the true optimal solution.

Thus, in FIG. 8, selective refinement in a GTSP graph 110 is illustrated. In the GTSP graph 110, a, b and c are nodes in the graph, belonging to different clusters, where some of the edges (lines connecting nodes) entering and exiting node b are shown. Additionally, a cost or weight for each edge is shown, labeled $\alpha$, $\beta$, $\gamma$, $\delta$, $\eta$, and $\theta$. In the transformed GTSP graph 112, the node b has been replaced by two "clone" nodes b1 and b2, which belong to the same cluster as b (and are thus mutually exclusive), are identical in all respects to b, but have different incident edges; the edges incident on a (of which only one is shown) have not changed, while a new incoming edge to c has been added. The node b1 can now be interpreted as "b in the context of being the immediate successor to a", while b2 is interpreted as "b in any other context".

A first property to note in this transformation is that if it is assumed that the costs $\beta_1$ and $\beta_2$ are equal to $\beta$, then, while the transformed graph 112 has one node and three edges more than the original one, the optimal tours are exactly the same, with the same total costs, as can be seen by careful inspection. However, b1 (resp. b2) is now specialized to the context of being (resp. not being) the immediate successor of a, and hence these specialized contexts are capitalized upon in order to better define the costs $\beta_1$ and $\beta_2$ with respect to this additional knowledge. In particular, when this transformation is applied to the SMT situation, $\beta_1$ is aware of the target words associated with a, allowing it to exploit a trigram language model for conditioning the first target word of c.

Given a GTSP graph, a well-formed tour $\tau$ relative to the graph is considered. According to the given weights on the edges of the GTSP graph, $\tau$ has a certain cost, which is its apparent cost. According to some external measure, the same tour $\tau$ may actually have a different cost, which is its true cost. An example of this situation occurs when the GTSP edges carry bigram costs for the language model, while the true score should be computed according to trigram knowledge. More generally, the true cost of the tour may depend on some less local property of the tour than can be accounted by weights local to the edges of the graph.

The costs on the edges of the GTSP graph may be defined as "optimistic" if an only if, for any well-formed tour $\tau$ relative to the graph, the apparent cost of the tour is less than or equal to its true cost. The notion of "optimism" bears some similarity to the notion of admissible heuristic (e.g. A*) in tree search; as in that case, optimistic edge costs that are "realistic" are of interest. However, it will be noted that a significant difference with standard search heuristics is that these are used for taking local decisions in the expansions of a search tree, while the herein-described heuristic procedure focuses on iteratively providing more and more accurate specifications of the problem graph, with emphasis on parts of the graph on which the "attention" of the TSP solver is focused, and then letting a "global" TSP solver find the currently best apparent solution. With this notion in place, the general procedure that is performed is described below with regard to FIGS. 9A and 9B.

Figure 9A:
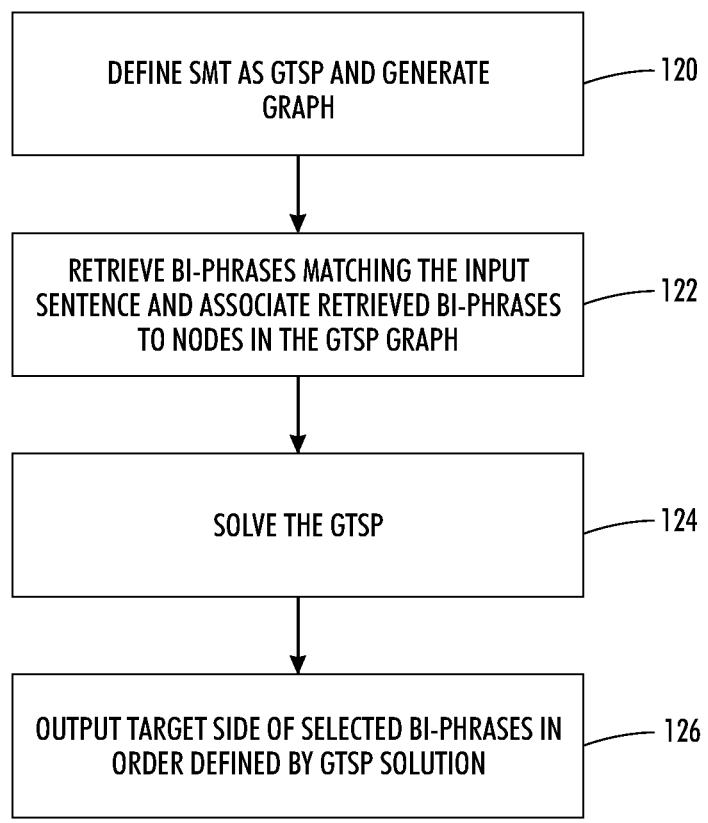
FIG. 9A illustrates a method for performing phrase-based statistical machine translation as a traveling salesman problem, in accordance with various aspects described herein.

FIG. 9A illustrates a method for performing phrase-based statistical machine translation as a traveling salesman problem, in accordance with various aspects described herein. At 120, an SMT is defined as a GTSP, and a GSTP graph is generated. At 122, bi-phrases are retrieved that match the source sentence, wherein the bi-phrases respectively correspond to nodes in the GTSP graph. Each bi-phrase includes a first language phrase (e.g., a phrase matching a phrase in the input or source sentence, in the language of the input sentence), and a second language phrase (e.g., the input phrase translated into the second or target language). At 124, the GTSP is solved. Bi-phrases are selected as a function of the GTSP solution and target or second language phrases of the selected bi-phrases are output in an order defined by the GTSP solution, at 126.

In one embodiment, solving the GTSP includes transforming the GTSP into an ATSP, transforming the ATSP into a standard TSP, and solving the TSP to translate the blocks of the input sentence. Solving the TSP is performed using a Concorde solver or a Lin-Kernighan heuristic or the like.

Figure 9B:
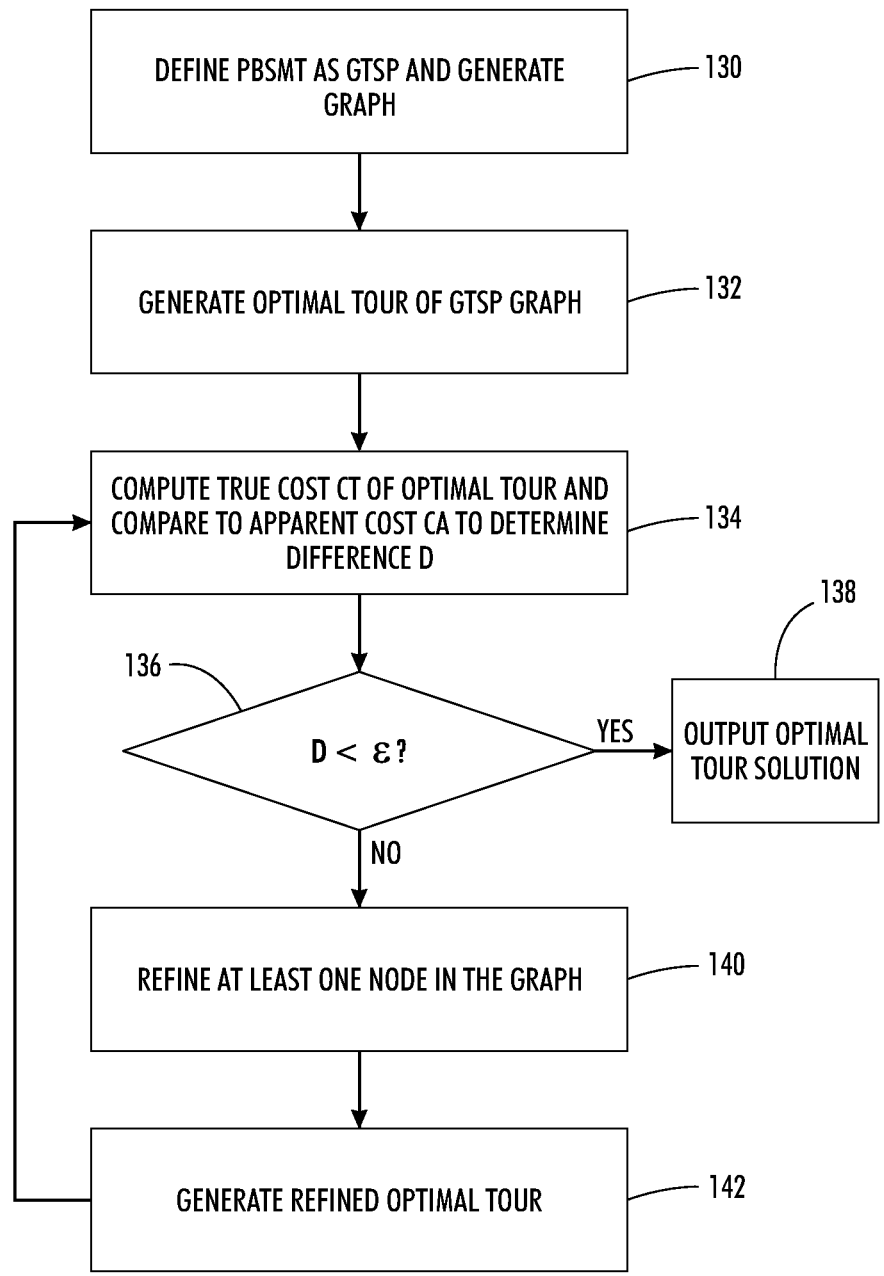
FIG. 9B illustrates an alternate method for performing phrase-based statistical machine translation as a traveling salesman problem, in accordance with various aspects described herein.

FIG. 9B illustrates an alternative or additional method for performing phrase-based statistical machine translation as a traveling salesman problem, in accordance with various aspects described herein. At 130, an initial specification of a GTSP graph $G_0$, which is optimistic relative to the true costs of its tours, is initialized such that i=0. Nodes in the graph define bi-phrases associated with blocks of a segmented sentence. At 132, a GTSP solver application (e.g., TSP solver 23 of FIG. 1) is launched, and an optimal tour $\tau_i$ relative to this graph is obtained (or an approximation of such an optimal tour if an approximate solver is used). At 134, the true cost $C_t$ of $\tau_i$ is computed (e.g., since all edges of $\tau_i$ are known). Because $G_i$ is optimistic, the true cost will be larger than an apparent cost $C_a$ of $\tau_i$ relative to $G_i$. At 136, a determination is made regarding whether the difference D between the apparent cost and the true cost is less than a predefined threshold value $\epsilon$.

If the difference D between the two costs is smaller than a certain threshold $\epsilon$, then the solution $\tau_i$ is output and the method terminates, at 138. If not, at 140, at least one node of $G_i$ is refined, and in particular certain nodes appearing on $\tau_i$ (but possibly also some others) according to the principle of FIG. 7. During such refinements, the graph $G_i$ remains optimistic, but tighter values are provided for $\beta_1$ and $\beta_2$ than were provided by $\beta$. Namely constraints such as $\beta_1 > \beta$ are provided, and possibly also $\beta_2 > \beta$. At 142, a new graph $G_{i+1}$ is obtained, as a result of the refinement. The method the reverts to 134, but with i:=i+1.

This method of FIG. 9B has several important properties. For instance, on any iteration, the apparent cost of $\tau_i$ is a lower bound of the true cost of the true optimal tour $\tau_{true}$ in the original graph, namely that tour whose true cost is minimal over true costs of all tours. For example, in the case of an exact TSP solver, true_cost($\tau$) $\geq$ true_cost($\tau_{true}$), for all tours $\tau$ (by definition of $\tau_{true}$) true_cost($\tau_{true}$) $\geq$ apparent_cost($\tau_i$): because $\tau_i$ is optimal over an optimistic specification of the cost of all tours, and in particular, true_cost($\tau_{true}$) $\geq$ apparent_cost($\tau_{true}$) $\geq$ apparent_cost($\tau_i$).

When the algorithm exits on $G_i$ and $\tau_i$, then apparent_cost($\tau_i$)+$\epsilon \geq$ true_cost($\tau_i$). Thus apparent_cost($\tau_i$)+$\epsilon \geq$ true_cost($\tau_i$) $\geq$ true_cost($\tau_{true}$) $\geq$ apparant_cost($\tau_i$). In other words, the tour $\tau_i$ that has been found at iteration is an approximation of the true optimal tour, with a true cost negligably different from that of the true optimal tour.

As for the termination properties of the algorithm, they depend on two facts: the graph cannot be refined indefinitely, because there are only a finite number of possible refinements; and when the nodes on a given tour become sufficiently refined, then the apparent cost of the tour (depending on such refined weights as $\beta_1$ and $\beta_2$) will be equal to its true cost.

The methods illustrated in FIGS. 9A and 9B, in addition to other techniques or algorithms described herein, may be implemented in a computer program product that may be executed on a computer. The computer program product may be a computer-readable recording medium (e.g., the memory 13) on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented (e.g., by the processor 12) on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowcharts shown in FIGS. 9A and 9B, can be used to implement the method for performing phrase-based SMT using a GSTP model.

Figure 10:
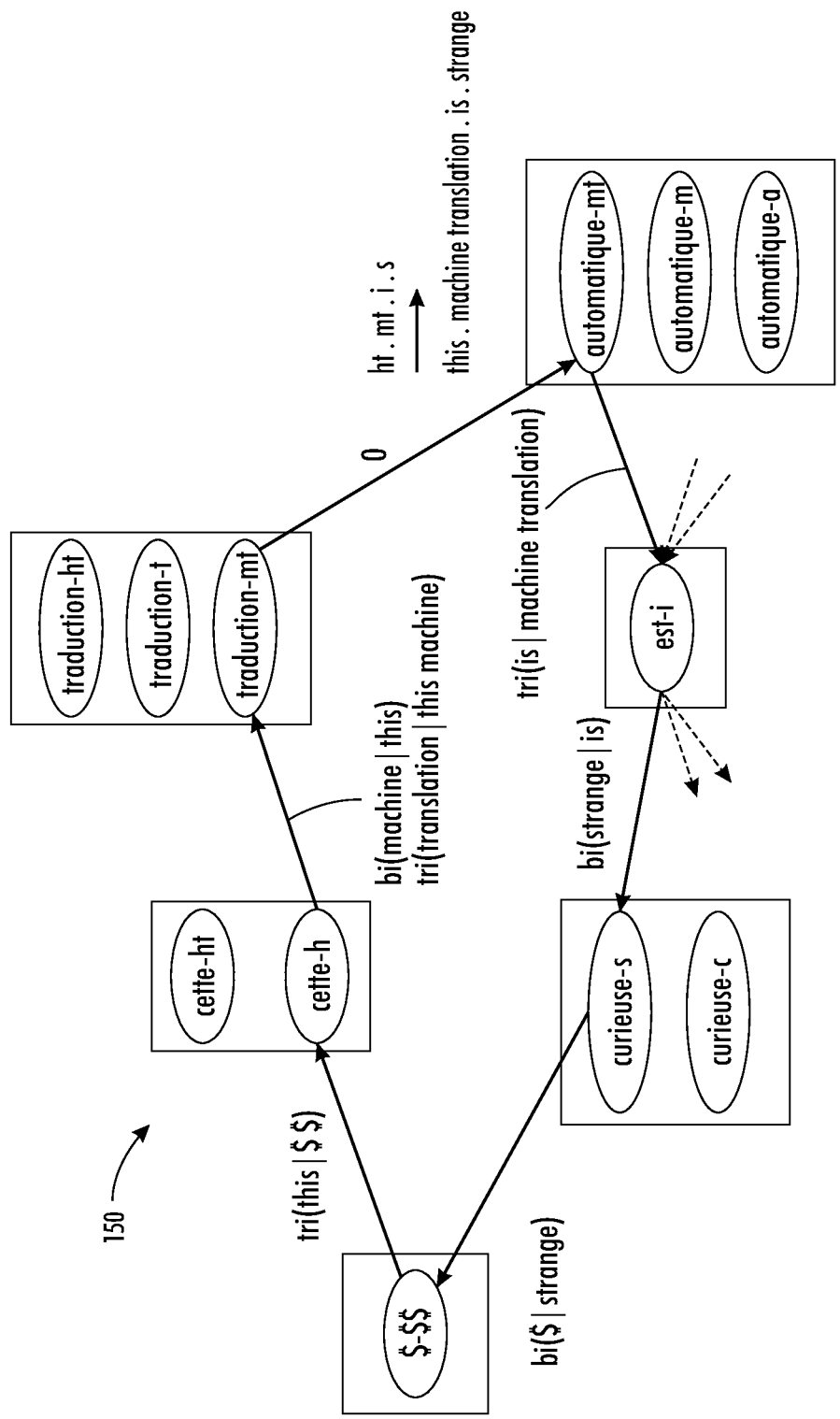
FIG. 10 illustrates a graph for performing phrase-based translation using a trigram language model, in accordance with various aspects described herein.

FIG. 10 illustrates a graph 150 for performing phrase-based translation using a trigram language model, in accordance with various aspects described herein. It will be appreciated that the same approach could straightforwardly apply to 4-grams, 5-grams, and so on. The trigram language model facilitates a procedure that provides us with an estimate p(z|xy) of the probability of a word z following the two words x and y. In one embodiment, the language model internally stores all triples (x,y,z) along with their probabilities. In another embodiment, the language model stores corpus counts for certain trigrams, bigrams and unigrams explicitly, and relies on smoothing techniques for computing p(z|xy) from these tables.

The approach is as follows: while p(z|xy) is considered to provide the ground truth about the target language model, all edges of the initial graph need not be labeled with trigram costs tri(z|xy) $\triangleq$ –log p(z|xy), but rather some edges can be labeled (those edges (a,b) for which node a only has one word on the target side) with a "bigram proxy" bi(z|y), defined as:

$$\text{bi}(z|y) \triangleq \min_x -\log p(z|xy)$$

In other words, the proxy bi(z|y) is the estimate for the cost of the transition between y and z that is maximally optimistic relative to the word x that may precede y. Here the minimum is over those x that are relevant for the specific sentence to be translated, e.g., those x that are identical to the last target word of a bi-phrase for translating the sentence, and not over all possible words x in the vocabulary. Note that it will not be true in general that bi(z|y)=–log p(z|y), where p(z|y) represents the bigram language model derived from p(z|xy), so bi(z|y) does not represent the bigram probability in the usual sense of the term.

Thus, the graph 150 of FIG. 10 is obtained by starting with a GTSP graph identical with that of FIG. 5, where the language model costs on the edges are as specific as possible given the context available on these edges, that is, which are either of the form tri(z|xy) or of the form bi(z|y) depending on the preceding bi-phrase. An example is given by the graph 150, where all the edges for a certain tour are shown, and in addition, are informally indicating (dotted lines) the incident edges on the node est-i, on which the explanation focuses.

A TSP solver is launched to obtain an apparent optimal tour, using certain bi costs, but also some tri costs. The true cost of the tour in the graph 150 is computed, which involves computing all the true trigram costs tri(this|$ $), tri(machine|$ this), tri(translation|this machine), tri(is|machine translation), tri(strange|translation is), and tri($|is strange). The true cost is compared with the (smaller) apparent cost, and if the difference is smaller than $\epsilon$, no further action need be taken.

Figure 11:
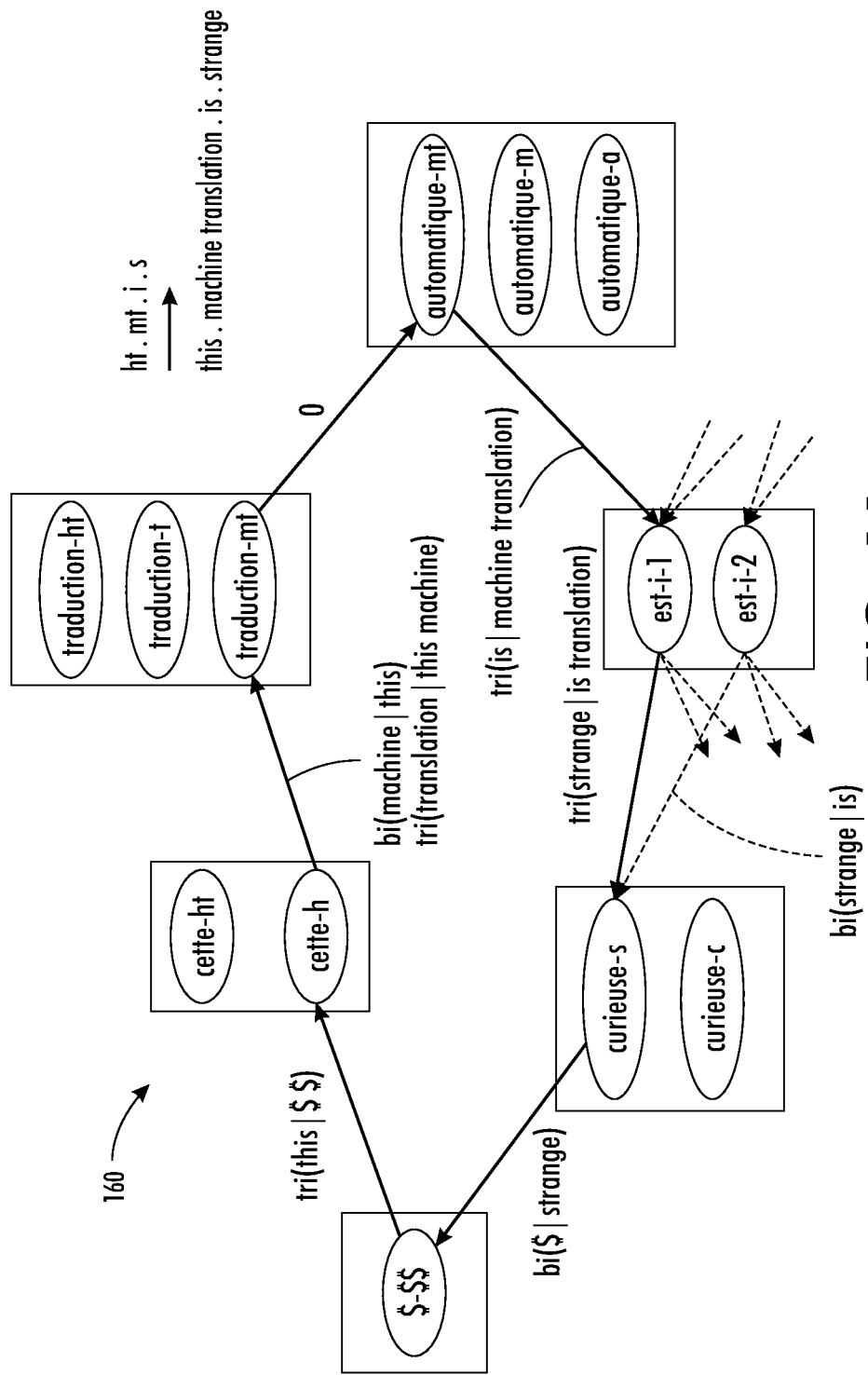
FIG. 11 shows a graph that is obtained if the difference is larger than or equal to $\epsilon$, using the procedure described with regard to FIGS. 7 and 9, applied to at least one triple of nodes (a,b,c) on the identified tour.

FIG. 11 shows a graph 160 that is obtained if the difference is larger than or equal to $\epsilon$, using the procedure described with regard to FIGS. 7 and 9, applied to at least one triple of nodes (a,b,c) on the identified tour. For instance, the procedure of FIG. 7 can be applied with (a,b,c)=(automatique-mt, est-i, curieuse-s), to obtain the graph 160, where there is sufficient context on the edge linking est-i-1 to curieuse-s to compute the tri cost of the edge. Note that bi(strange|is) has been retained on the dotted edge linking est-i-2 to curieuse-s, although a slightly tighter bound could be obtained by re-computing the cost by minimizing over nodes that may precede est-i-2, excluding automatique-mt.

Once the graph 160 has been obtained, the TSP solver is re-launched and the procedure is performed iteratively. Whenever the new apparent optimal tour contains the edge (est-i-1, curieuse-s), then the cost of this edge will be more accurate than it was previously. The approach that simply consists of refining just one triplet on the apparent optimal tour at each iteration will terminate at some point, because otherwise at some point the apparent optimal tour would necessarily have all its edges carrying tri costs, and hence its apparent cost would be equal to its true cost, and hence would satisfy the ε threshold criterion.

While this provides a formal proof of convergence of the algorithm, it may be more efficient on each iteration to refine more than a single triple, in order for the transformed graph to more quickly "mimic" the true status of the costs. I will be appreciated that all the possible variants and/or permutations of such an approach are intended to fall within the scope of the present description. However, a simple method is to refine all the triplets (a,b,c) that appear on the current apparent optimal tour (at most n such refinements can be done if the source sentence length is n). Note that the compiling-out technique described in the previous section corresponds to an exhaustive refinement of all the trigrams and so is at one extreme of what selective refinement techniques can do.

In this manner, if the new apparent tour shares some subpaths with the previous apparent tour, as is likely to happen in an SMT context, then it will capitalize on the refined knowledge on these paths. Note that it is possible that the new tour is actually identical with the previous tour, even if the ε-threshold condition was not met by the previous tour; this is because the costs other than the language model costs may more than compensate the loss associated from moving from bi costs to tri costs on this path.

While the preceding description has focused on handling trigrams, it is easy to see that the approach of selective refinement extends to n-grams (where n is an integer). The approach can be employed to provide extended context for trigrams, 4-grams, etc., and the method is effective as long as refining the language model cost of some parts of a tour does not diminish the optimality of the tour given all the other SMT constraints.

The following description provides a number of examples of the manner in which the generalized TSP approach is applied using a phrased-based translation technique. First, the artificial task of reconstructing the original word order (e.g., monolingual word reordering) is considered. For example, words in English sentences can be randomly permuted, and the original word order can be reconstructed by maximizing the language model score over all possible permutations. The reconstruction procedure may be seen as a translation problem from "Bad English" to "Good English." Usually, the language model score is used as one component of a more complex decoder score that also includes bi-phrase and distortion scores. However, in this particular "translation task" from bad to good English, all "bi-phrases" are considered to be of the form e-e, where e is an English word, and therefore distortion need not be taken into account. Rather the quality of the permutation as it is measured by the language model component is considered. It should be noted that here, because of the special nature of the biphrases used (for each "source word" e, there is exactly one possible "bi-phrase" e-e), each cluster of the Generalized TSP representation of the decoding problem actually contains exactly one node; in other words, the Generalized TSP in this situation is actually a standard TSP.

Because the decoding phase is equivalent to a word re-ordering in this particular situation, the language model score may be used to compare the performance of different decoding algorithms. Here, three different algorithms are compared: classical beam-search; decoder based on the exact TSP solver (proposed transformation plus Concorde solver); and decoder based on an approximate TSP solver (Lin-Kernighan-heuristic or LK-heuristic, proposed transformation+LK implemented in the Concorde solver, etc.).

The beam-search and the LK-based TSP solver are algorithms in which the trade-off between the approximation quality and the running time can be controlled. To measure the re-ordering quality, two scores are used. The first score is the language model score; all three algorithms try to maximize this score, so a natural evaluation procedure is to plot the language model score value versus the elapsed time. The second score is the bi-lingual evaluation understudy (BLEU) score, where the value of the BLEU score between the reconstructed and the original sentences is used to measure the algorithm's reconstruction quality.

Figure 12:
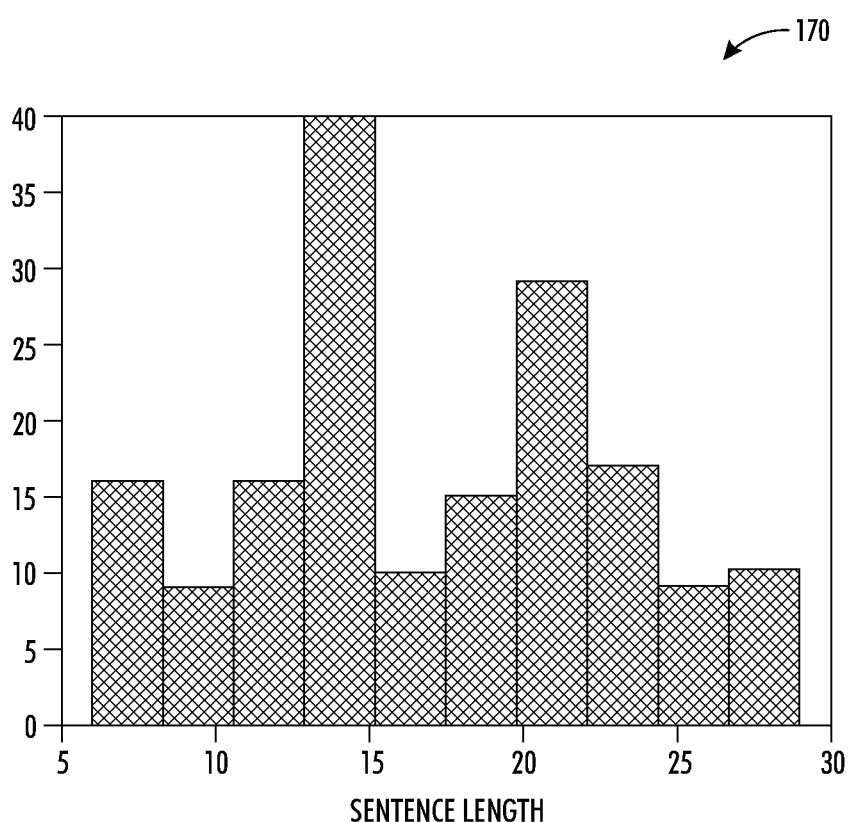
FIG. 12 illustrates a histogram showing the distribution of sentence lengths in an experimental test data set.

FIG. 12 illustrates a histogram 170 showing the distribution of sentence lengths in an experimental test data set. A training data set for learning the language model consists of 50000 sentences, and a test dataset for word reordering consists of 170 sentences. Only sentences of length less than 30 words were selected, and the average length of test sentences is equal to 17 words.

Figure 13:
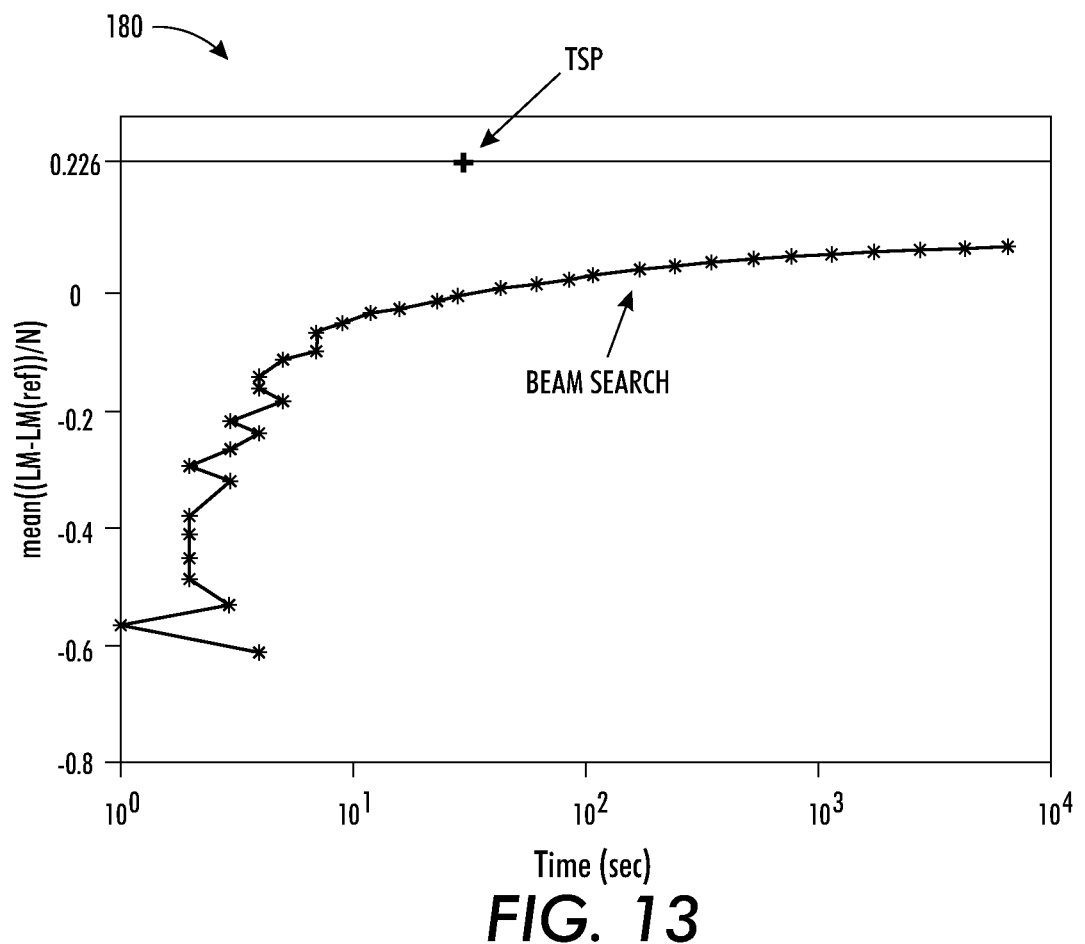
FIG. 13 shows a graph illustrating language model score as a function of time for a bigram language model.

FIG. 13 shows a graph 180 illustrating language model score as a function of time for a bigram language model. For bigram-based reordering, a bi-gram language model is considered, and the algorithms try to find the optimal re-ordering that maximizes the language model score. An exact TSP solver 24 (FIG. 1) is used in this example, that is it finds the optimal tour. The x axis corresponds to the cumulative time for processing the 170 sentences of the test set; the y axis corresponds to the mean difference (over all sentences) between the language model score of the output and the language model score of the reference (N is the length of each sentence, which corresponds to reporting language model scores per word). The line corresponds to using a beam-search technique with different thresholds, which result in different processing times and performances. The cross TSP corresponds to using the exact-TSP decoder (in this case the time to the optimal solution is not under user's control).

It will be noted that the cross labeled "TSP" and several points on the beam search line have positive y coordinates. This means that, when using a bi-gram language model, it is possible to re-order the words of a randomly permuted reference sentence in such a way that the language model score of the re-ordered sentence is actually larger than the language model score of the reference; in particular, this means that maximizing the language model score of a permutation of the reference will in general not recover exactly this reference. Some examples are presented below:

Reference (LM score=−2140.37): let us remember, Mr. speaker, that these segments of our society form the backbone of our economy.

Maximum of the LM score (LM score=−2138.3): these segments of our economy, Mr. speaker, let us remember that form the backbone of our society.

Reference (LM score=−2549.73): there is just one specific item more that I would like to comment upon and then I will sit down, Mr. speaker.

Maximum of the LM score (LM score=−2547.05): Mr. speaker, and I would then there is just one specific item more like that I will sit down to comment upon.

Figure 14:
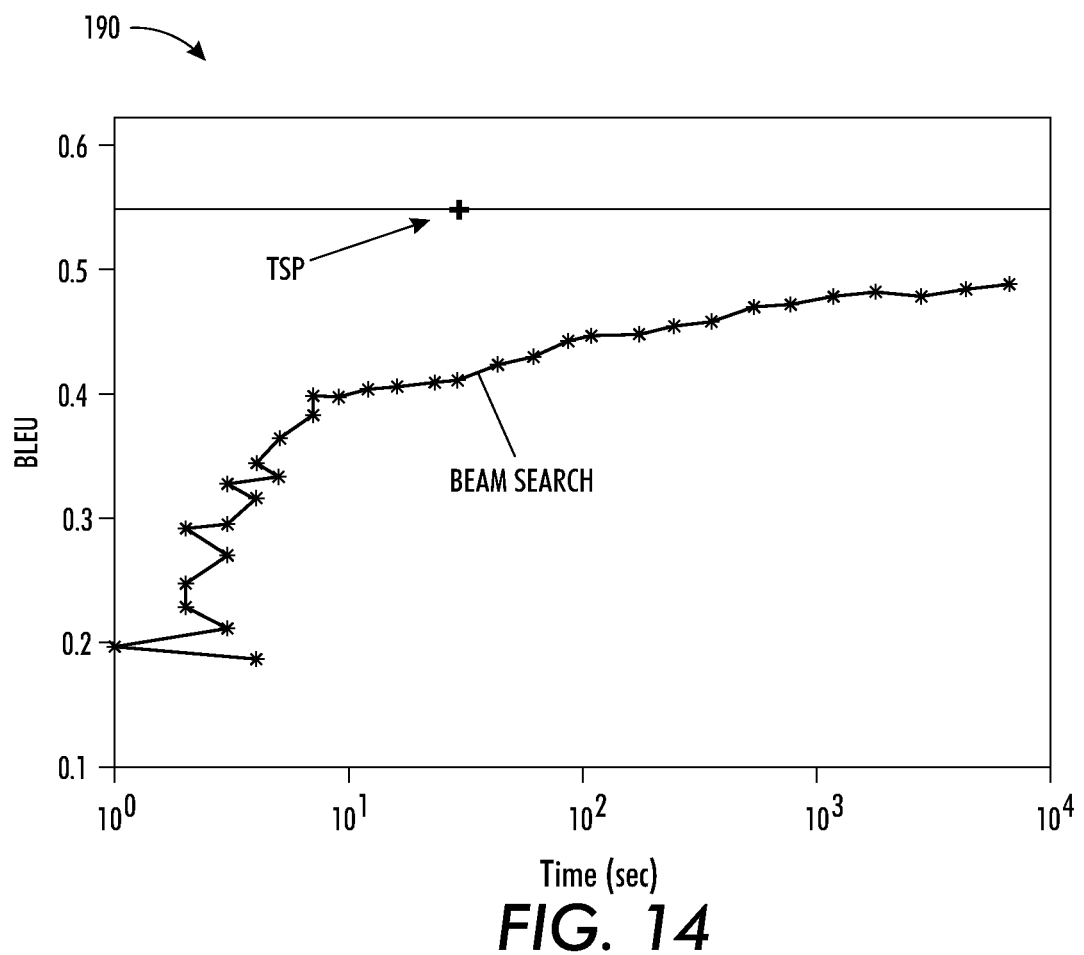
FIG. 14 illustrates a graph showing BLEU score as a function of time for a bigram model.

FIG. 14 illustrates a graph 190 showing BLEU score as a function of time for a bigram model. The increase in the language model score of the beam-search with time is steady but very slow, and never reaches the level of performance obtained with the exact-TSP procedure, even when increasing the time by several orders of magnitude relative to that required by exact-TSP. Also to be noted is that the solution obtained by the exact TSP solver is very likely the optimum, which is less likely the case of the beam-search procedure. In FIG. 14, the BLEU score of the re-ordered sentences in the test set is shown relative to the original reference sentences. Here it can be seen that the exact-TSP outputs are closer to the references in terms of BLEU than the beam-search solutions. Although the TSP output does not recover the reference sentences (it produces sentences with a slightly higher language model score than the references), it does reconstruct the references better than the beam-search.

Figure 15:
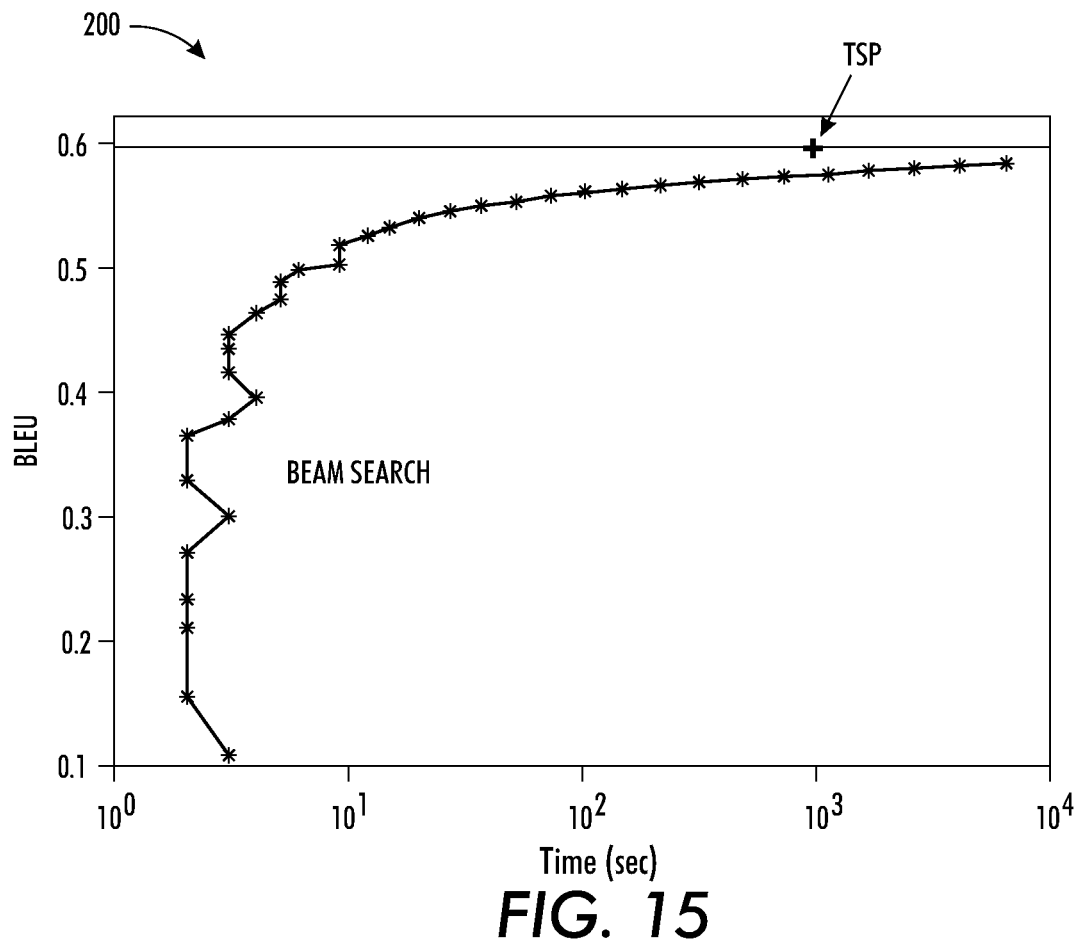
FIG. 15 illustrates a graph showing language model score as a function of time for a trigram language model.

FIG. 15 illustrates a graph 200 showing language model score as a function of time for a trigram language model. A tri-gram based language model is considered, and the reordering algorithms try to find the optimal reordering by maximizing the language model score. The trigram model used was a variant of the exhaustive compiling-out procedure described in with regard to FIG. 7. Again, an exact TSP solver 24 (FIG. 1) is used to generate the graph 200.

Figure 16:
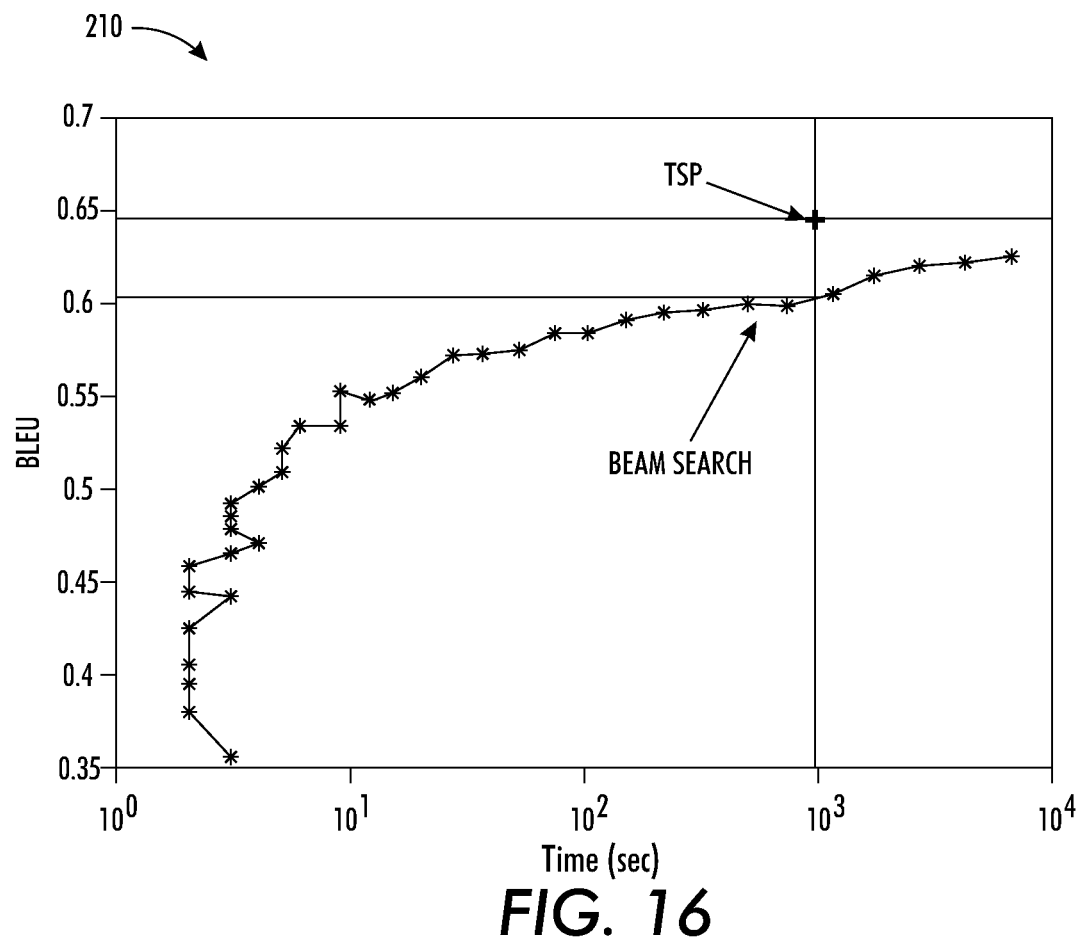
FIG. 16 illustrates a graph showing BLEU score as a function of time for a trigram language model.

FIG. 16 illustrates a graph 210 showing BLEU score as a function of time for a trigram language model. Experiments with trigram language models show similar trends to those with bigrams.

Figure 17:
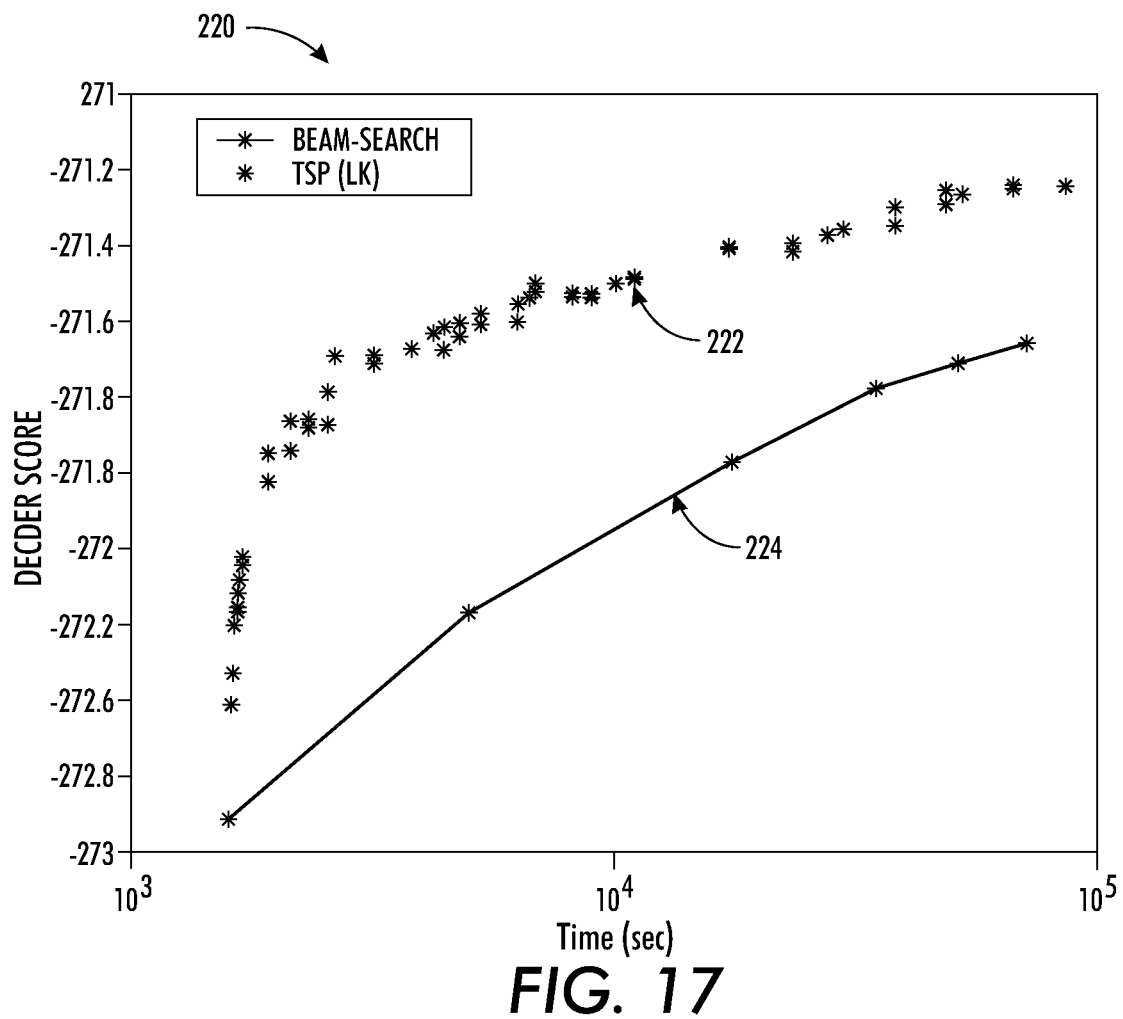
FIG. 17 illustrates a graph showing average value of the decoder score over 500 test sentences as a function of total time to translate the sentences.

FIG. 17 illustrates a graph 220 showing average value of the decoder score over 500 test sentences as a function of total time to translate the sentences. The graph considers a real translation task, namely, translation from English to French on the basis of a bi-phraselibrary trained on, for instance, the European Parliement corpus Europarl. The training set was approximately 2.81e+6 sentences, and the test set was 500 sentences.

The graph 220 shows a plurality of points 222 corresponding to a TSO solver (LK algorithm) iterated a particular number of times. A line 224 corresponds to a Beam-search algorithm executed and different thresholds. The trade-off between quality and time in the case of an LK decoder is controlled by the number of iterations (e.g., more iterations imply longer time and better quality). The trade-off between quality and time in the case of Beam-search is controlled by varying the beam threshold.

Figure 18:
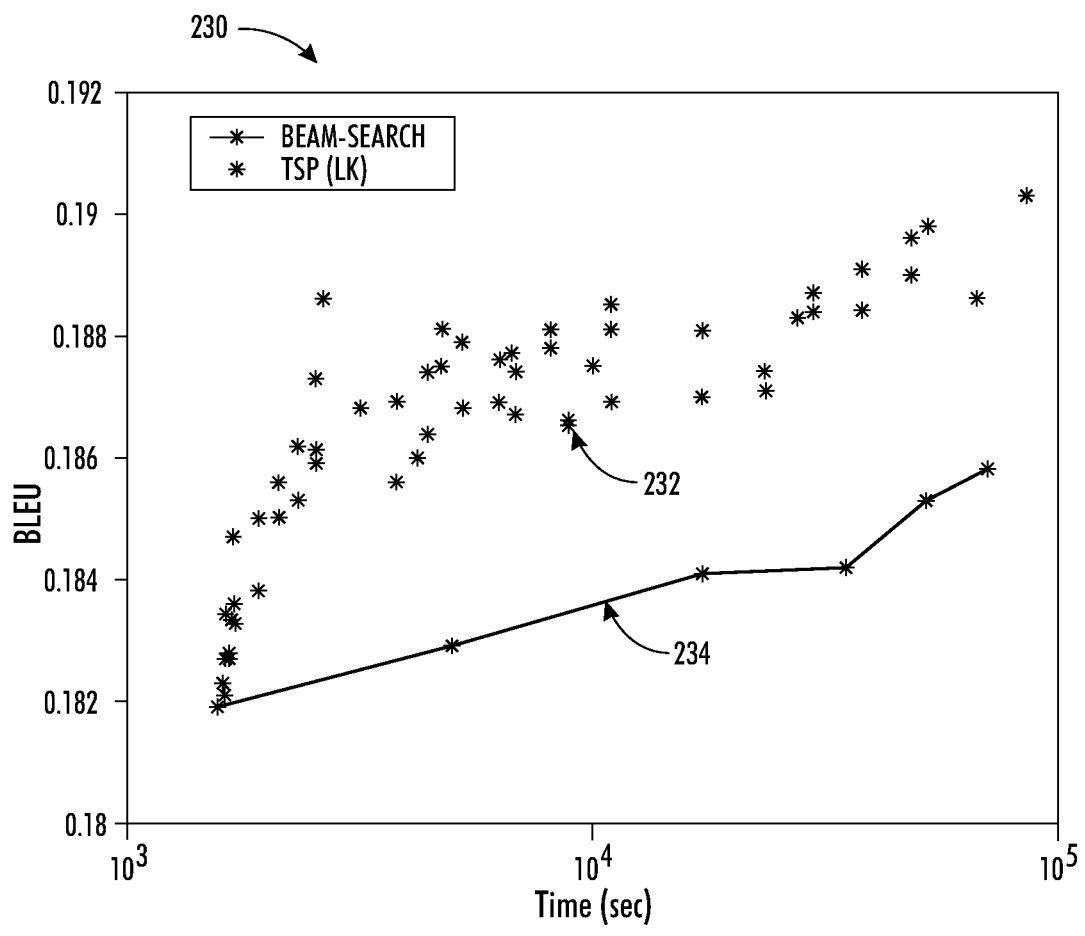
FIG. 18 illustrates a graph showing average value of the BLEU score (over 500 test sentences) as a function of time.

FIG. 18 illustrates a graph 230 showing average value of the BLEU score (over 500 test sentences) as a function of time. A plurality of points 232 correspond to a TSO solver (LK algorithm) iterated a particular number of times. A line 234 corresponds to a Beam-search algorithm executed and different thresholds. The trade-off between quality and time in the case of an LK decoder is controlled by the number of iterations (e.g., more iterations imply longer time and better quality). The trade-off between quality and time in the case of Beam-search is controlled by varying the beam threshold.

Because in the real translation task the size of the TSP graph is much larger than in the artificial re-ordering situation, the exact TSP solver becomes difficult to apply due to time constraints; instead, the approximate LK algorithm (e.g., approximate solver 25 of FIG. 1) may be used and compared to the Beam-Search algorithm. The efficiency of the LK algorithm can be significantly increased by using a good initialization. To compare the quality of the LK and Beam-Search methods, the technique uses rough initial solution produced by the Beam-Search algorithm using a small value for the stack size, and then use the initial solution as an initial point for the LK and further Beam-Search optimization (where the thresholds of the Beam-Search are varied in order to trade quality relative to time). It will be noted that LK outperforms Beam-Search in terms of the decoder score, as well as in terms of the BLEU score. The difference between the two algorithms (in terms of the BLEU score and of the decoder score) increases steeply at the beginning, which means that the quality of the Beam-Search solution by can be significantly increased using the LK algorithm.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of translating two languages using statistical machine translation (SMT) and a generalized asymmetric traveling salesman problem (GTSP) graph, comprising:
   defining a SMT problem as a GTSP;
   translating blocks of an input sentence using bi-phrases corresponding to nodes in a GTSP graph that represents the GTSP;
   solving the GTSP; and
   outputting the translated blocks in an order defined by the GTSP solution; and further comprising:
   generating an optimal tour of the GSTP graph;
   computing a true cost $C_t$ of the optimal tour;
   computing an apparent cost $C_a$ of the optimal tour;
   determining a difference D between a true cost $C_t$ and an apparent cost $C_a$ of the optimal tour;
   determining whether the difference D is less than a predetermined threshold $\epsilon$;
   outputting the optimal tour as a solution to the GSTP if D is less than the predetermined threshold $\epsilon$; and
   translating the input sentence from a first language to a second language using the output GSTP solution;
   wherein the true cost $C_t$ of the optimal tour is computed using n-gram costs, where n is an integer greater than or equal to 3.

2. The method of claim 1, wherein solving the GTSP further comprises:
   transforming the GTSP to an asymmetric traveling salesman problem (ATSP);
   transforming the ATSP to a standard traveling salesman problem (TSP); and
   solving the TSP to translate the blocks of the input sentence.

3. The method of claim 2, further comprising solving the TSP using at least one of a Concorde solver and a Lin-Kernighan-heuristic.

4. The method of claim 1, further comprising:
   refining at least one node in the graph if D is greater than or equal to the predetermined threshold c, and generating a refined graph comprising the refined node; and
   iteratively computing the true cost $C_t$ and apparent cost $C_a$ for one or more refined graphs, determining the difference D there between, and comparing the difference D to the predetermined threshold $\epsilon$ until D is less than c.

5. The method of claim 1, wherein the optimal tour visits each node exactly once, wherein edges between nodes in the optimal tour are each associated with a respective bigram weight, and wherein the apparent cost $C_a$ of the optimal tour is computed by summing the bigram weights of all edges in the tour.

6. The method of claim 1, further comprising generating the optimal tour of the graph using at least one of an approximate solver algorithm and an exact solver algorithm.

7. The method of claim 1, wherein the SMT is a phrase-based SMT (PBSMT).

8. A non-transitory computer readable recording medium comprising instructions, which when executed on a computer cause the computer to perform the method of claim 1.

9. A system that facilitates phrase-based statistical machine translation (PBSMT), comprising:
a processor that:
defines a PBSMT as a generalized traveling salesman problem (GTSP);
translates blocks of an input sentence using bi-phrases corresponding to nodes in a GTSP graph that represents the GTSP;
solves the GTSP; and
outputs the translated blocks in an order defined by the GTSP solution;
wherein the processor is further configured to:
generate an optimal tour of the GSTP graph;
output the optimal tour as a solution to the GSTP upon determining that a difference D between a true cost $C_t$ and an apparent cost $C_a$ of the optimal tour is less than a predetermined threshold $\epsilon$; and
translate the input sentence from a first language to a second language using the output GSTP solution;
wherein the true cost $C_t$ of the optimal tour is computed using n-gram costs, where n is an integer greater than or equal to 3.

10. The system of claim 9, wherein to solve the GTS, the processor:
transforms the GTSP to an asymmetric traveling salesman problem (ATSP);
transforms the ATSP to a standard traveling salesman problem (TSP); and
solves the TSP to translate the blocks of the input sentence.

11. The system of claim 10, wherein the processor solves the TSP using at least one of a Concorde solver and a Lin-Kernighan-heuristic.

12. A method of phrase-based statistical machine translation (PBSMT), comprising:
defining a PBSMT task as a generalized traveling salesman problem (GTSP);
generating a graph of the GTSP comprising a plurality of nodes;
generating an optimal tour of the graph;
computing a true cost $C_t$ of the optimal tour;
computing an apparent cost $C_a$ of the optimal tour;
determining a difference D between the true cost $C_t$ and an apparent cost $C_a$;
determining whether the difference D is less than a predetermined threshold $\epsilon$;
outputting the optimal tour as a solution to the GSTP if D is less than the predetermined threshold $\epsilon$; and
translating an input sentence from a first language to a second language using the output GSTP solution;
wherein the true cost $C_t$ of the optimal tour is computed using n-gram costs, where n is an integer greater than or equal to 3.

13. The method of claim 12, further comprising refining at least one node in the graph if D is greater than or equal to the predetermined threshold $\epsilon$, and generating a refined graph comprising the refined node.

14. The method of claim 13, further comprising iteratively computing the true cost $C_t$ and apparent cost $C_a$ for one or more refined graphs, determining the difference D there between, and comparing the difference D to the predetermined threshold $\epsilon$ until D is less than $\epsilon$.

15. The method of claim 12, wherein the optimal tour visits each node exactly once, wherein edges between nodes in the optimal tour are each associated with a respective bigram weight.

16. The method of claim 15, wherein the apparent cost $C_a$ of the optimal tour is computed by summing the bigram weights of all edges in the tour.

17. The method of claim 12, further comprising:
associating with the input sentence a plurality of blocks, each block corresponding to a bi-phrase that includes a phrase pair having a first-language phrase and a corresponding second-language phrase;
identifying an optimal selection and ordering of blocks using the output GTSP solution;
and outputting a corresponding ordering of the second-language phrases of the selected blocks.

18. The method of claim 12, further comprising generating the optimal tour of the graph using at least one of an approximate solver algorithm and an exact solver algorithm.

* * * * *